United States Patent [19]

Woods et al.

[11] 4,206,503
[45] Jun. 3, 1980

[54] MULTIPLE LENGTH ADDRESS FORMATION IN A MICROPROGRAMMED DATA PROCESSING SYSTEM

[75] Inventors: William E. Woods, Natick; Philip E. Stanley, Westboro; Richard A. Lemay, Bolton, all of Mass.

[73] Assignee: Honeywell Information Systems Inc., Waltham, Mass.

[21] Appl. No.: 868,251

[22] Filed: Jan. 10, 1978

[51] Int. Cl.² ............................................. G06F 9/20
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,331,056 | 7/1967 | Lethin et al. | 364/200 |
| 3,344,404 | 9/1967 | Curewitz | 364/200 |
| 3,522,589 | 8/1970 | Thron | 364/200 |
| 3,735,355 | 5/1973 | Balogh, Jr. et al. | 364/200 |
| 3,949,378 | 4/1976 | Crabb et al. | 364/200 |
| 3,972,024 | 7/1976 | Schroeder et al. | 364/200 |
| 4,047,247 | 9/1977 | Stanley et al. | |

OTHER PUBLICATIONS

Brown, W. W. et al., "Instructions for Byte Addressing Capability", IBM TDB, vol. 16, No. 3, Aug. 1973, pp. 812-815.

Primary Examiner—Mark E. Nusbaum
Assistant Examiner—Thomas M. Heckler
Attorney, Agent, or Firm—William A. Linnell; Nicholas Prasinos; Ronald T. Reiling

[57] ABSTRACT

A final effective address of an operand is generated in a microprogrammed data processing system by use of a base address register which may include an unindexed address, an index register which may include an indexed address value, an instruction register which may include an instruction word, which instruction word provides control over the addressing of a control store dependent upon the state of a selected one of a plurality of test conditions. One of the test conditions indicating whether some of the addressing values used in the generation of the effective address are in a short address format or in a long address format. The address control store word provides signals for controlling the operation of the system, including the branch in between such major operations as instruction fetching, addressing, reading, writing, and execution as well as branching between minor operations which are included in the major operations.

4 Claims, 20 Drawing Figures

RAM LOCATION NUMBER

| | 0C | 10 | 17 18 | 1F |
|---|---|---|---|---|
| 0 | //// | //// | INSTRUCTION WORD | |
| 1 | //// | //// | M1 | |
| 2 | //// | //// | M2 | |
| 3 | //// | //// | M3 | |
| 4 | RTC ENABLED | | M4 | |
| 5 | //// | //// | M5 | |
| 6 | WDT ENABLED | | M6 | |
| 7 | //// | //// | M7 | |
| 8 | WORK REGISTER | | | |
| 9 | WORK REGISTER | | | |
| A | B6 STACK/QUEUE LOWER LIMIT | | | |
| B | B7 STACK/QUEUE LOWER LIMIT | | | |
| C | LAST CIP INSTRUCTION WORD | | | |
| D | LAST SIP INSTRUCTION WORD | | | |
| E | B6 STACK/QUEUE UPPER LIMIT | | | |
| F | B7 STACK/QUEUE UPPER LIMIT | | | |

*FIG. 1A*

MULTIPLE LENGTH ADDRESS FORMATION IN A MICROPROGRAMMED DATA PROCESSING SYSTEM

BACKGROUND OF THE INVENTION

One of the most difficult problems facing the minicomputer architect is that of sufficient address space. Address fields must be potentially large enough so that all of the data and procedures for a process can be directly addressed without recourse to slow, complex memory mapping schemes, while at the same time retaining the architectural simplicity and minimal hardware cost which characterize the minicomputer.

A minicomputer is usually organized around a fixed relatively small memory word size, typically 12 to 18 bits, and uses that word size as a common controlling parameter throughout its architecture. Operands, instructions and addresses are all usually of that same size. Frequently, both for reasons of cost, and for purposes of address manipulation, addresses and operands even share the same operating registers.

The use of such an organization can be very cost-effective, but has the serious deficiency that it creates a de facto limit on memory size, by requiring that addresses be no longer than operands. If memory word/register size is 16 bits, the most common size, then addresses are constrained to a maximum size of 65,536 words.

This has proven to be a severe limitation in recent years, for both functional and economic reasons. Tasks and applications tend to expand in scope, requiring additional memory; operating systems and higher-level languages, while improving system functionality, have a major impact on memory size. Reduced memory costs have also fueled user requirements for large memories. Memory costs decreased at the rate of 26% to 41% per year; since users tend to buy constant dollar amounts of memory, it follows that the amount of address space typically required doubles every two to three years.

Numerous examples exist of minicomputer architectures which have accepted this de facto limit on memory size, and then been found wanting as the damand for larger memories increased.

Because of software and hardware development costs, studies for new minicomputer architecture usually require that the architecture support an entire family of computers. This means that the new architecture must support not only the system with a large address base and elaborate operating systems, but also the small OEM-oriented system where speed and minimum program size are essential. Equally essential, however, is the necessity not to impair the software mobility, the ability to transport programs from machines at one end of the family to machines at the other.

A particular objective of any architecture is to develop a method of dealing with addressing which would not be tied to word size, but be open-ended, clean and consistent in all members of the family. Address size should be of no concern to the programmer, and should not impair program mobility from one member of the family to another.

If, by way of example, a 16-bit word size represented the largest address size, memory size would be limited to 64K words; sufficient for present applications, but obviously inadequate for future needs. To have a reasonable certainty of being able to satisfy memory requirements for the life of a computer family, a maximum memory size should be at least 8 to 10 million words, thus implying an address size of at least 23 bits. However, addresses larger than 16 bits require 2 words of memory to hold them, and take twice as long to load and store. The large-system user, running under an operating system, would not object to this burden, since it would significantly reduce the amount of storage management and overlay activity which, of necessity, accompanies a small address space. The small-system, OEM user would be unwilling to incur this time/space penalty, however, since his address space requirements are smaller, and his application is typically more cost/performance sensitive.

Examination of the nature and usage of addresses reveals some interesting properties, particularly in the ways in which they differ from other operands. All other operands are programmer visible, explicitly typed and sized structures, they are: bits, bytes, words or multi-words, etc. The programmer is aware of the size of the item he is dealing with and uses this characteristic in manipulating it. Addresses, however, are primarily the concern of the program assembler, and only of secondary interest to the programmer. He is chiefly interested in addresses as the names of structures, arrays and program locations. He wants to be able to assign names as required, and then use them wherever necessary, both for convenience and for ease of understanding. The last thing the programmer wants to do is to get immersed in address computation and manipulation. Address size is unimportant; as long as an address is "big enough" the programmer does not really care.

This consideration of the differences between addresses and other operands leads to a concept which is referred to as address size independence; a philosophy/architecture in which the size of addresses is essentially invisible to the programmer at the level of assembler source code, and is only apparent at the object code level.

Under this concept, the same source code can be assembled and run on any member of the family; however, the program assembler used to create object code for those members whose addresses are larger than 16 bits would be different from the program assembler used to create object code for the small members of the family. The large system program assembler would create two words of storage for each memory address in the code, the small system assembler only one.

Each system would receive object code containing addresses suitable to its hardware, while the programmer, operating at the level of the single source code from which both object codes are derived, would deal with addresses as tags and identities, in a non-size-specific fashion.

It is accordingly a primary object of the present invention to provide a data processing system having multiple length addressing modes.

SUMMARY OF THE INVENTION

The above and other objects of the invention are obtained by providing a data processing system comprising data storage means having a plurality of addressable word storage locations, each of the locations storing a group of binary data bits representing a data word, the words including instruction words and operand address words stored at addresses proximate to the instruction words, the instruction words containing a code representing an operation to be performed by the system and the operand address words representing either short form addresses including S address bits or long form addresses including L address bits, L being a number which is greater than S and exceeding the number of bits in a word. The system also has an address mode indicator, responsive to an address mode signal for indicating whether the system is operating in a first mode in which short form addresses are used or in a second mode in which long form addresses are used. The system further comprises register means for storing data used by the system in effecting operations called for by the operation code contained in the instruction words.

Further, the system includes fetch means, implemented for example by firmware control logic, for addressing the data storage means to read instruction word and operand address word data therefrom at the beginning at each instruction execution cycle of the system and to load the data into the register means. The fetch means further operates in response to the address mode indicator when the system is operating in the second mode to read a plurality of operand address words into the register means during a plurality of word read cycles. In addition, the fetch means includes means responsive to the address mode indicator when the system is operating in the second mode to combine the address bits of the plural operand address words read from the data storage means to provide in the register means a long form address of L bits.

BRIEF DESCRIPTION OF THE DRAWINGS

The above and other objects of the present invention are achieved in the illustrative embodiment as described with respect to the Figures in which:

FIG. 1A provides a diagram of the random access memory (RAM) utilized in the data processor shown in FIG. 1;

DETAILED DESCRIPTION OF THE PREFERRED EMBODIMENT

Figure 10A:
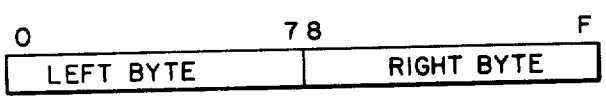
FIG. 10A illustrates the left and right bytes in a memory word of data.

In the data processing system of the present invention, all data word elements, such as such as bit, a byte, a double-word or a quad-word element are based on, by way of example, 16-bit memory words, the format of each word is defined from left to right with the first bit numbered 0. In the system of the present invention, memory data may be accessed by instruction to the bit, byte, word or multi-word data item level. In all cases, the left-most element is the most significant element of the word; e.g., bit 0 FIG. 10a is the first bit, bit 1 is the second bit, bit 0 through 7 are the first (left) byte, bits 8 through F (hexadecimal bit numbering is used throughout this specification) are the second (right) byte, etc. Multi-word items require successive word locations; the lowest address is defined as the left-most or most significant part of the data item. An address pointer is used to point to bit, byte, word or multi-word data items. This address indicates the left-most (or most significant) elements of the data item. Within an array, data items are numbered from left to right.

The central processor (CPU) of the present invention may operate in either a Long or Short Address Form (LAF or SAF). LAF address mode provides addressability to, by way of example, one million words, whereas SAF address mode provides addressability to, by way of example 64k words (K=1024). Addresses are unsigned. Byte addresses must be presented to the address lines of the external bus and must contain a bit which specifies left or right byte. Bit positions of the CPU address registers are numbered to correspond to their position on the address lines of the external bus with an appropriate number of leading zeros. In SAF mode, the CPU generates addresses which may contain seventeen significant bits as illustrated in word 1 of FIG. 10B. The sixteen most significant, of these seventeen bits, are numbered 10 through 1F. Note that the seventeenth bit, which addresses the left or right byte, is not shown in FIG. 10B. In LAF mode, the CPU generates addresses which may contain 21 significant bits. The twenty most significant, of these twenty-one address bits, are illustrated in FIG. 10C, words 1 and 2, with the most significant bit being numbered 0C and the least significant bit being numbered 1F. The twenty-first address bit, which addresses the left or right byte is not illustrated in FIG. 10C.

Figure 10B:
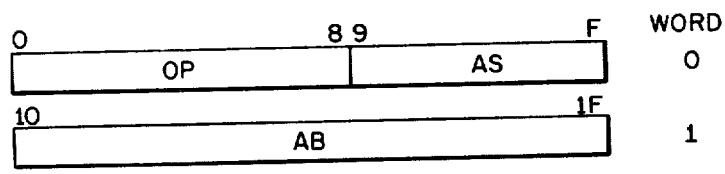
FIGS. 10B and 10C illustrate a single-operand instruction having an immediate address when the data processor shown in FIG. 1 is in SAF and LAF addressing modes respectively.
Figure 10C:
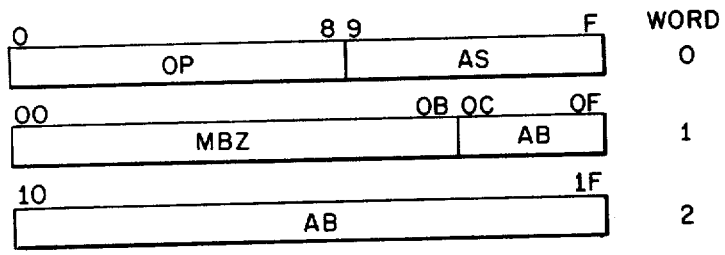

FIG. 10B illustrates the instruction format of a single-operand instruction of the present invention with a SAF mode immediate address. Word 0 in FIG. 10B contains the operation code in bits 0 through 8 and the address syllable which defines the addressing mode in bits 9 through F. Note, as will be explained hereinafter, the address syllable (AS) does not control the SAF or LAF addressing mode of the central processor. Word 1 in FIG. 10B contains the 16-bit address value (AB) in bits 10 through 1F.

FIG. 10C illustrates a single-operand instruction with a LAF mode immediate address contained in words 1 and 2. The operation code (OP) is again contained in bit position 0 through 8 of word 0 with the address syllable (AS) specified in bit positions 9 through F of word 0. Word 1 in FIG. 10C contains the four most significant bits of a 20-bit address in bit position 0C through 0F and requires that bit position 00 through 0B must be ZERO (MBZ). The least significant 16 bits of the 20-bit LAF mode address are contained in word 2, bits 10 through 1F.

The address syllable (AS) of the instruction word is used to specify how the CPU is to form the address of the operand, e.g., whether the operand is being addressed relative to the program counter or a base register, etc. The address syllable can also specify an indirect mode of addressing in which case a one word address may be contained in memory in the format shown for word one of FIG. 10B if in SAF mode and in two words of memory in the format shown in FIG. 10C for words 1 and 2 if in LAF mode.

As indicated hereinbefore, the address syllable (AS) of the instruction word does not control whether the CPU is in SAF or LAF addressing mode. In the central processor of the present invention, the SAF or LAF addressing mode is controlled by a switch on the control panel which when set in one position results in the setting of a FFLAF flip-flop to the binary ONE state to indicate that the CPU is operating in LAF mode. When set to the other position it sets the FFLAF flip-flop to the binary ZERO state indicating that the central processor is operating in SAF mode. Alternatively, the FFLAF flip-flop could be set and reset by a pair of instructions such that the addressing mode could be controlled by the execution of a program instruction. It is noted that the FFLAF flip-flop is one of the flip-flops contained in hardware control flip-flops 54 of FIG. 1.

Figure 1:
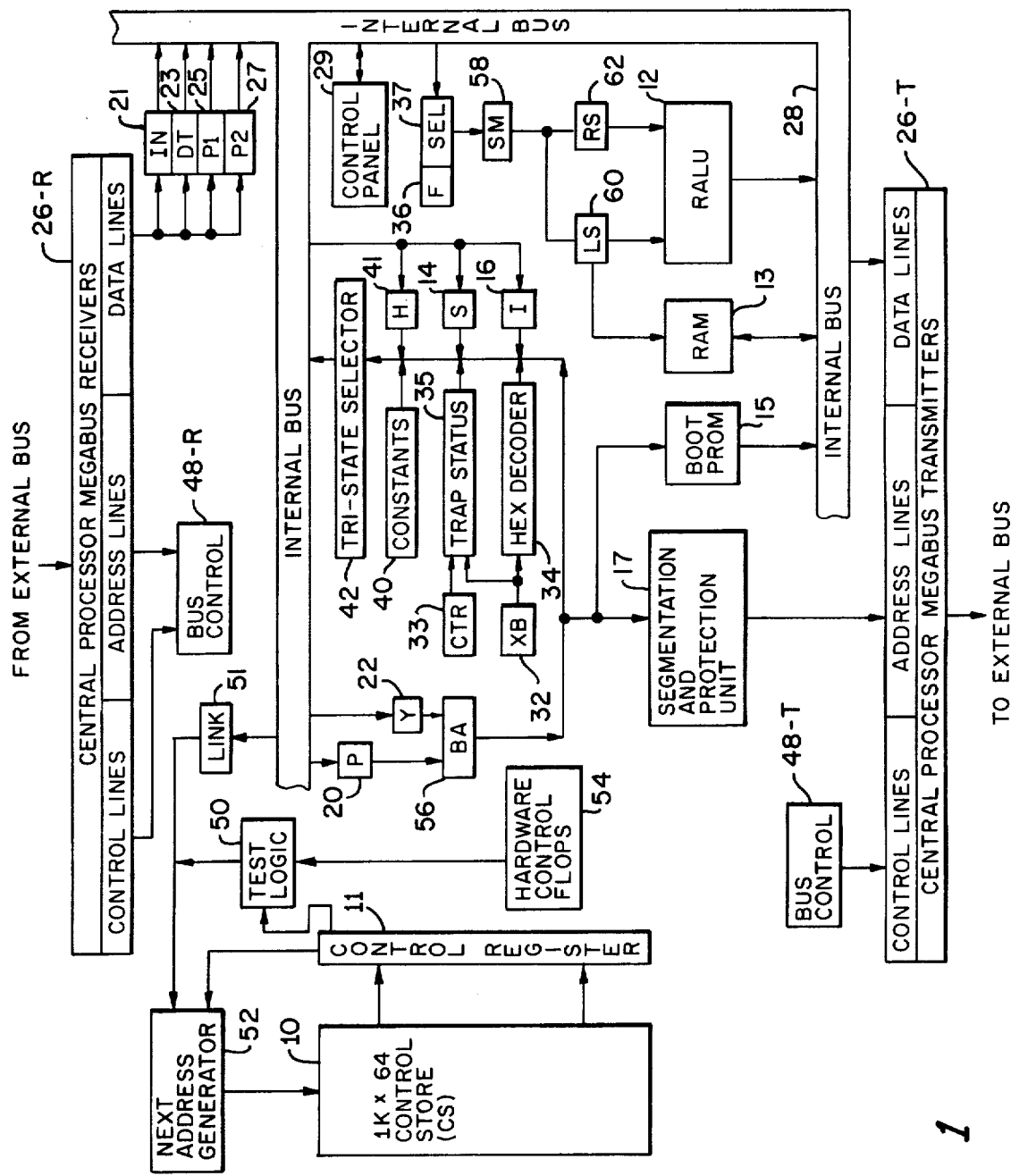
FIG. 1 illustrates a general block diagram of the overall system in which the present invention is included.
Figure 4:
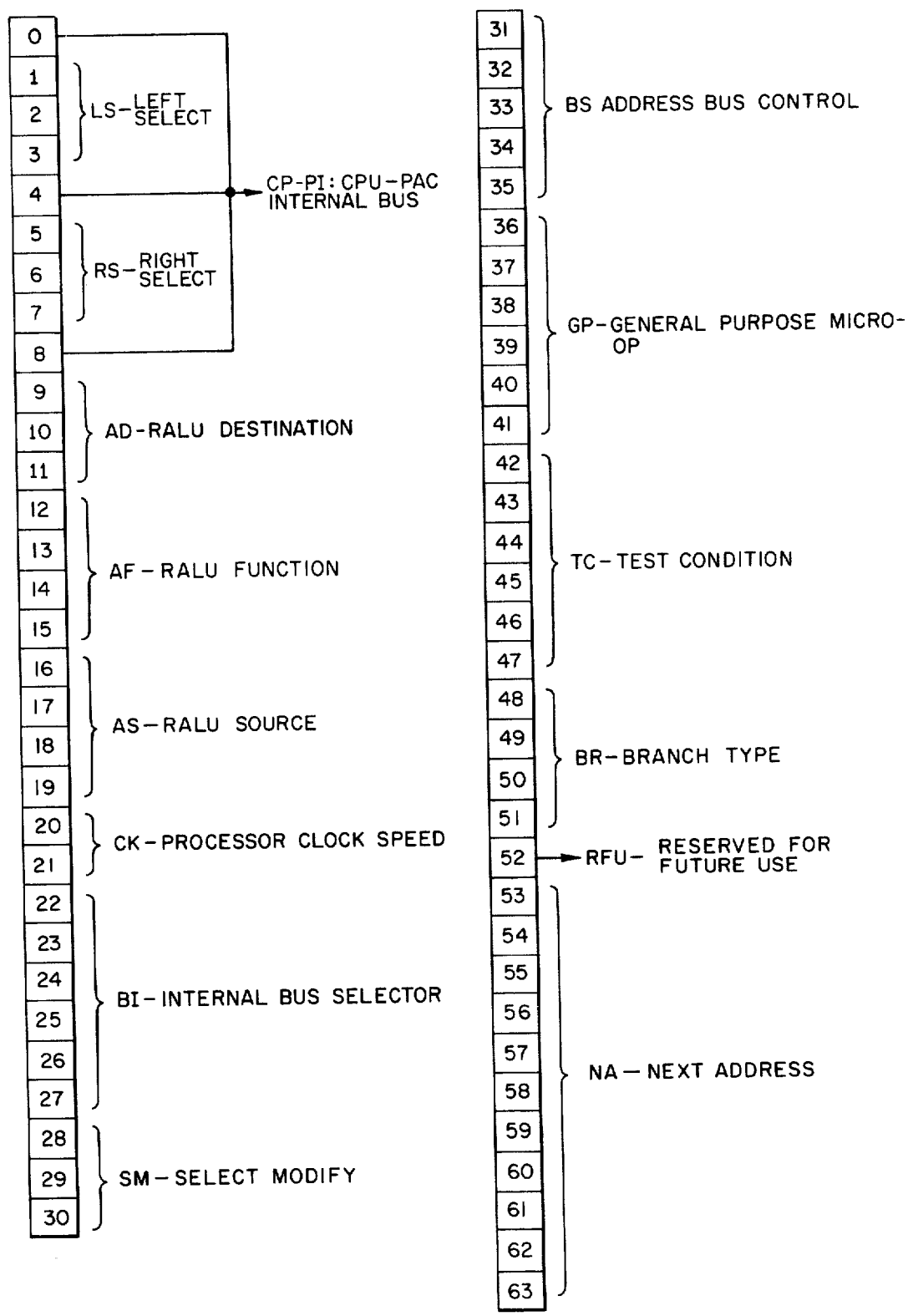
FIG. 4 illustrates the manner in which a firmware word included in such control store is configured.
Figure 5A:
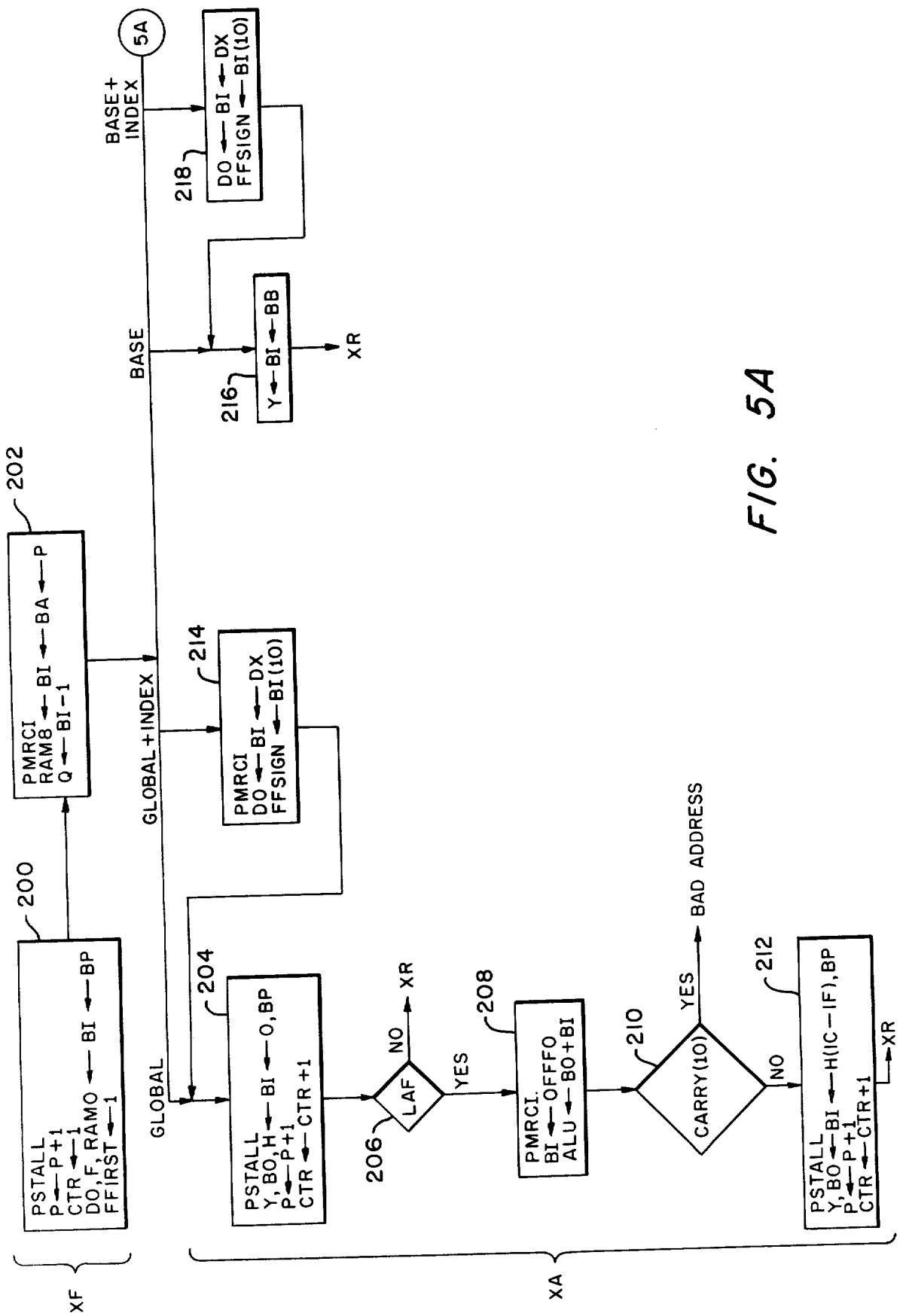
FIGS. 5A–5D and 6A–6D illustrate in detail the manner in which individual firmware words control the operation of the present invention in association with the control store and processor of FIG. 1.
Figure 5B:
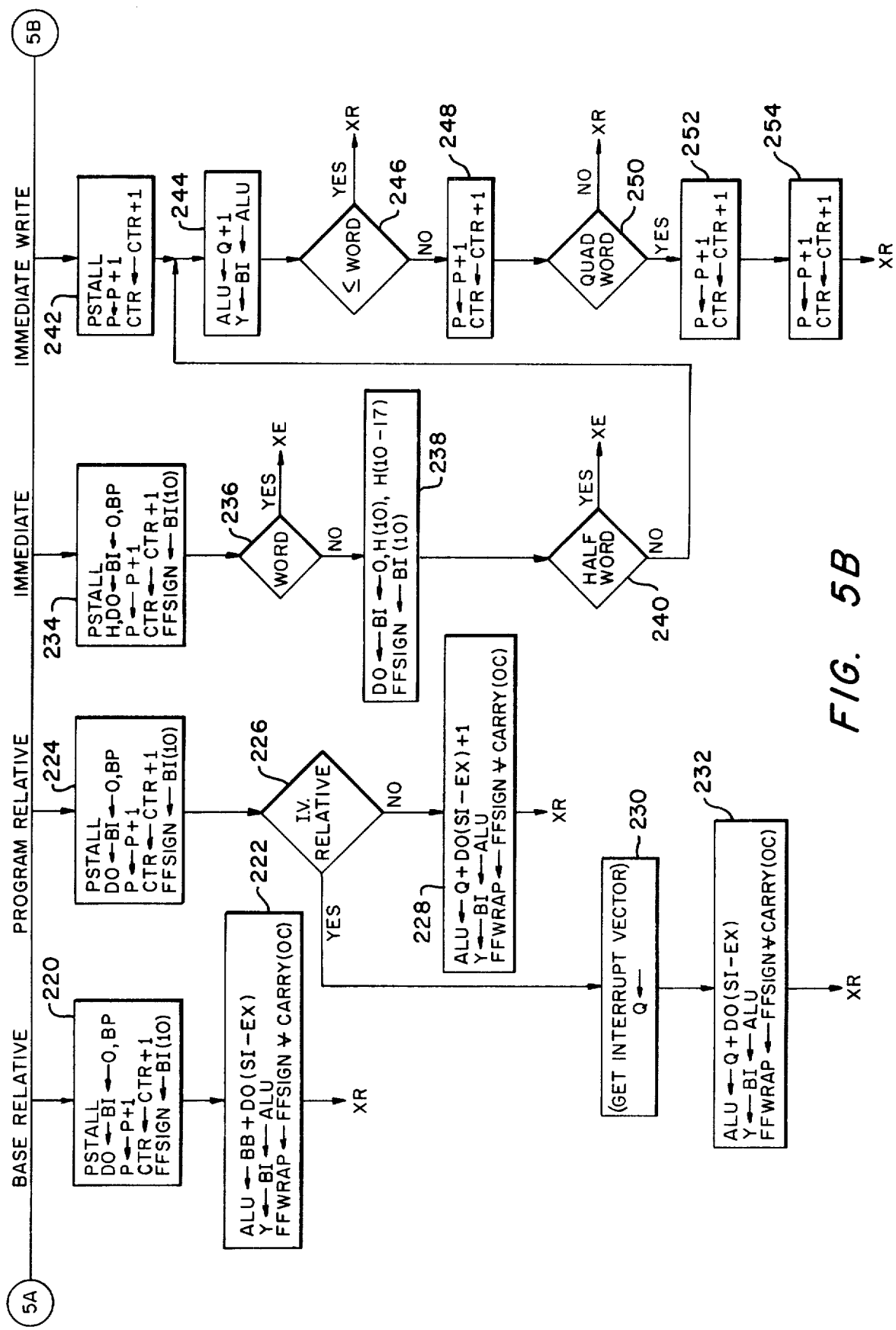
Figure 5C:
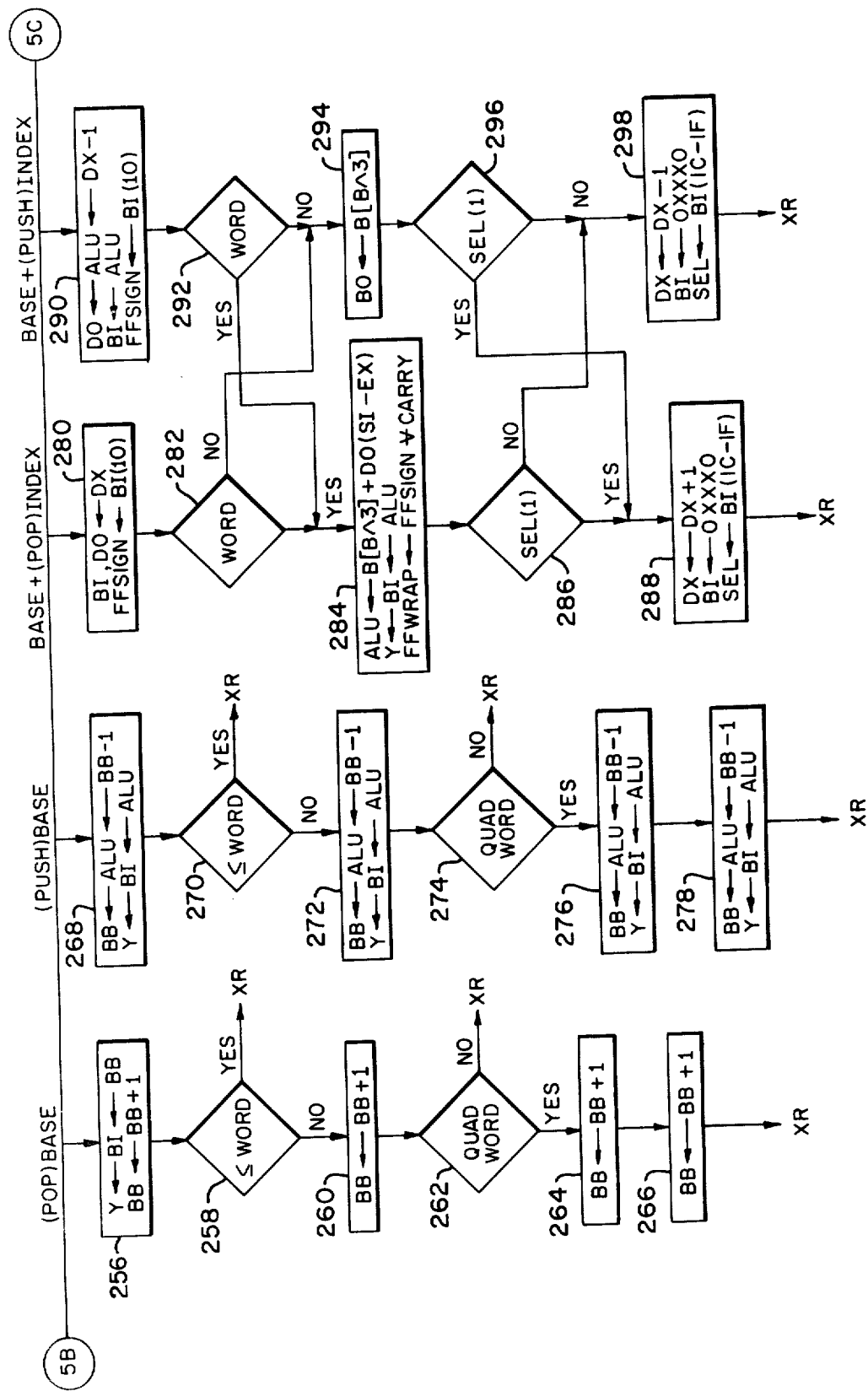
Figure 5D:
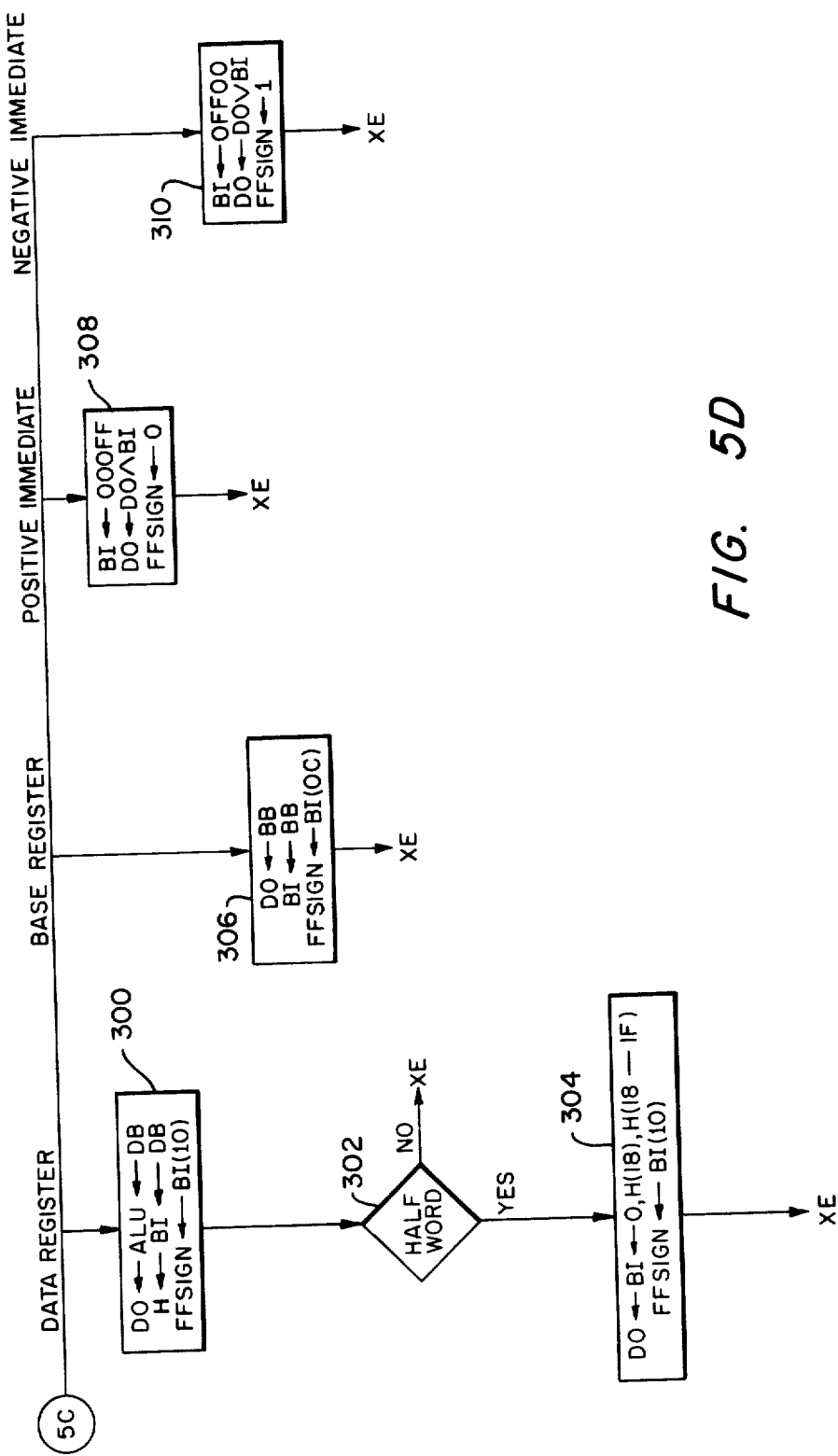
Figure 6A:
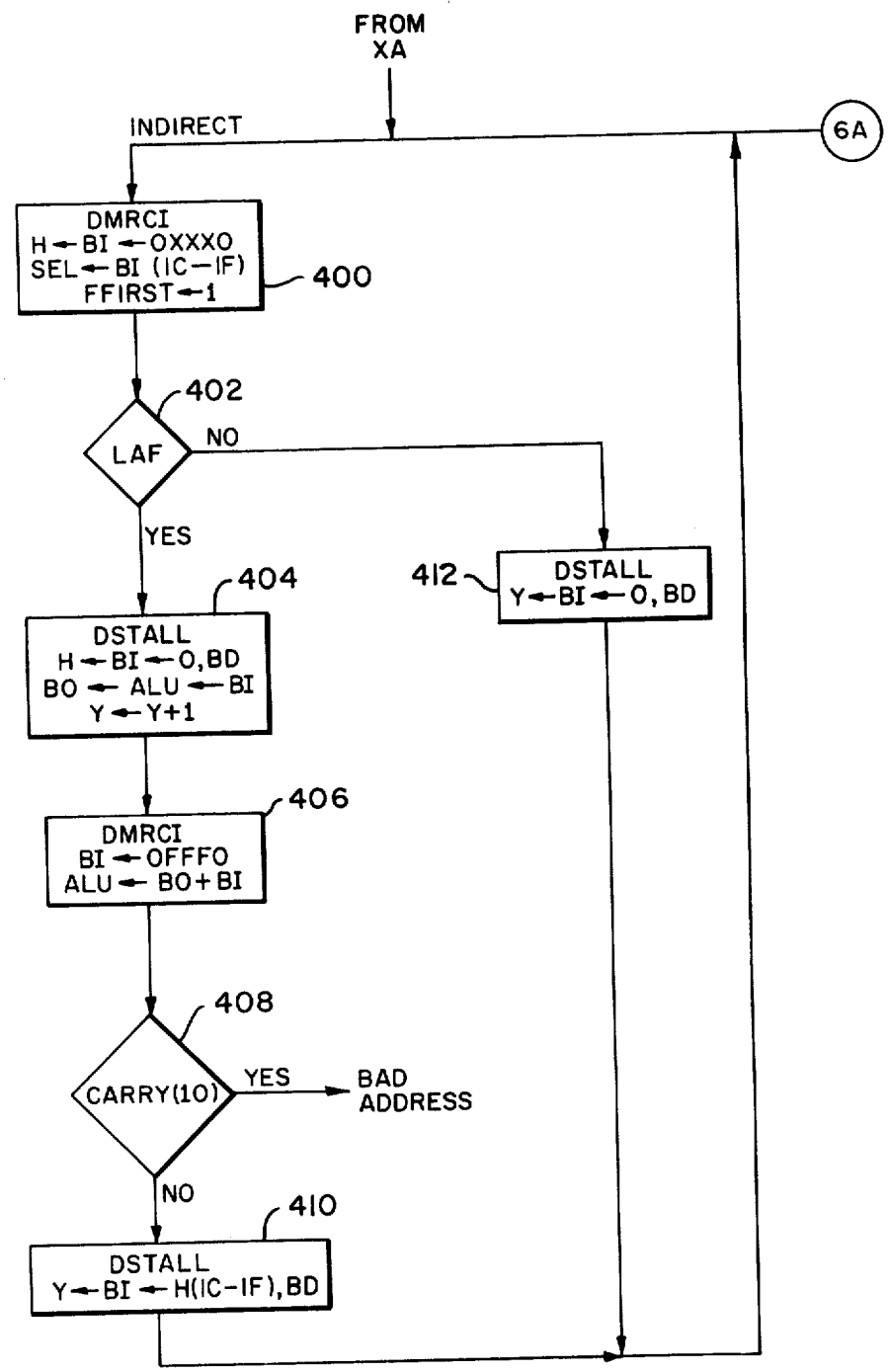
Figure 6B:
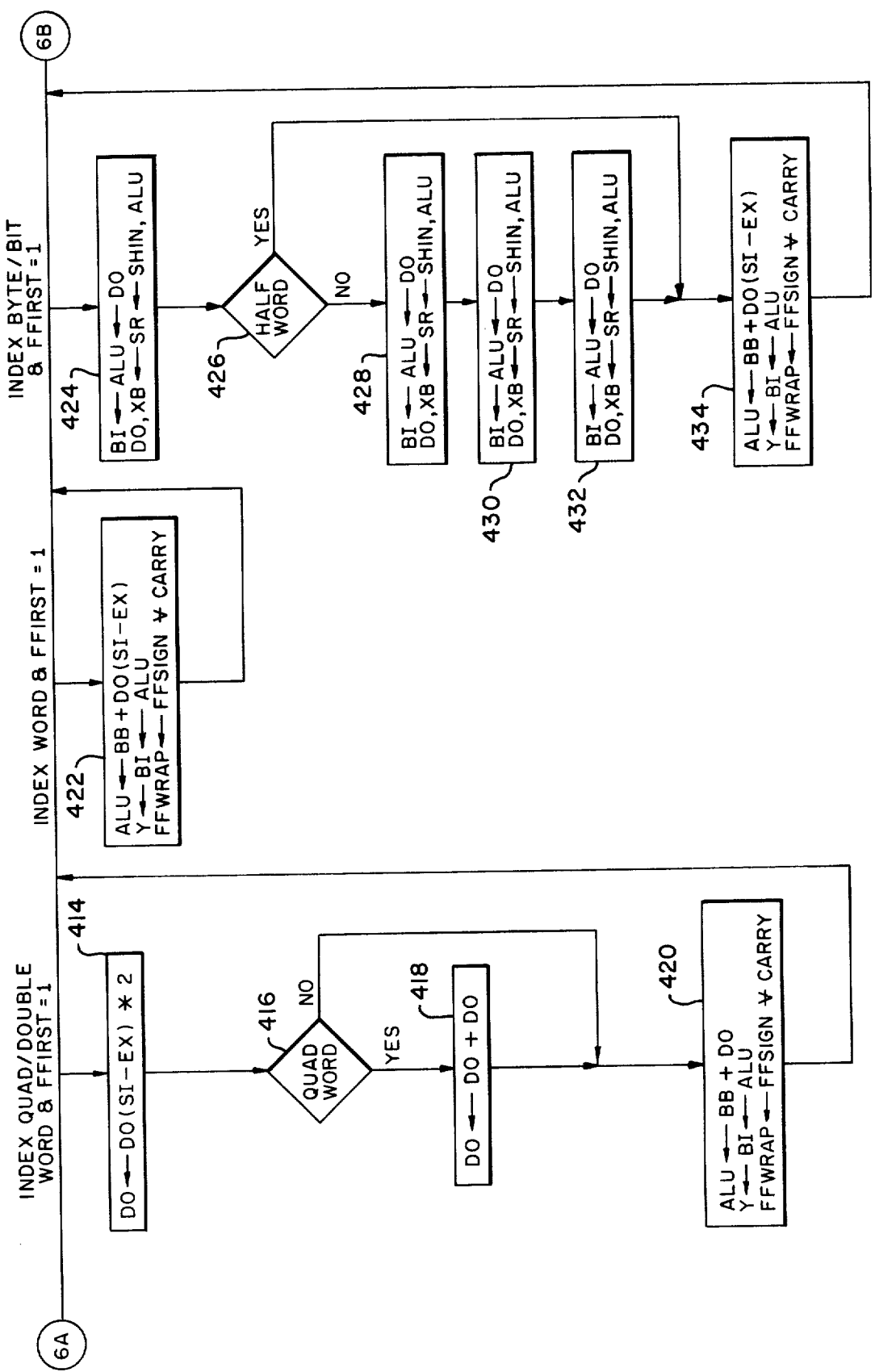
Figure 6C:
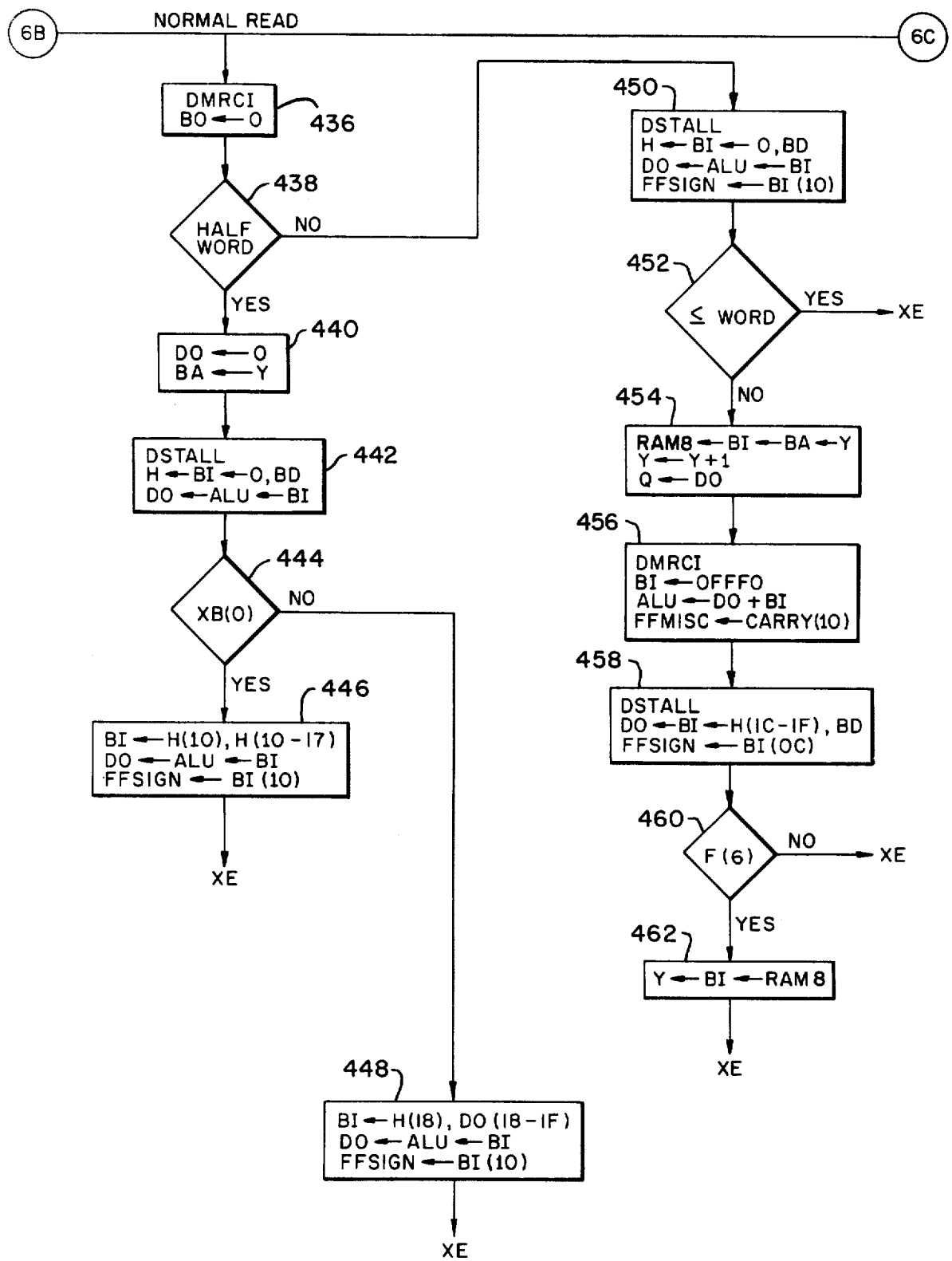
Figure 6D:
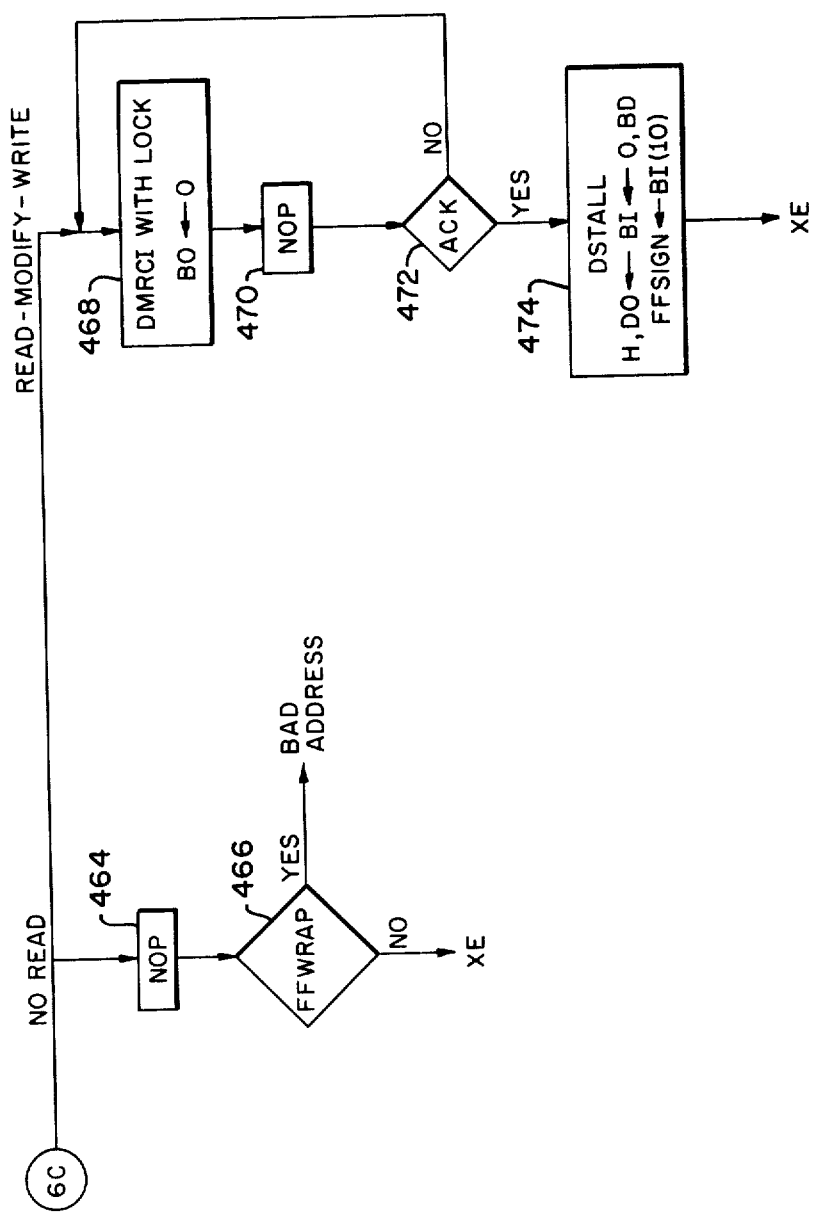

A block diagram of the data processor the data processing system is shown in FIG. 1. The system includes a control store 10 which includes by way of example 1024 locations, each location including 64 bits. Each such location is capable of storing a firmware word, such firmware words being used to control various hardware operations within the data processor. FIG. 4 is a diagram of a firmware word indicating the bits composing the various fields. It is understood that the number of such locations and/or firmware words and the number of bits in such words may be increased or decreased without departing from the scope of the present invention. Operation of a control store and the instruction decoding thereof is shown in the article entitled "Designing Optimized Microprogrammed Control Sections for Microprocessors", by C. W. Schultz, appearing at page 119 of the April, 1974 issue of Computer Design magazine.

The control store local register 11 (FIG. 1) consists of by way of example eight 8-bit D-type registers, which are used to store the control store word. The control store output is clocked into control register 11 by the central processor primary clock pulse and it remains in control register 11 until a new control store word is located into the register 11 by the next primary clock pulse.

The central processor test logic 50 selects by way of example one of 64 possible test conditions using control store bits 42 through 47. Depending upon whether the tested condition is true or false, the test condition true function is transmitted to the next address generator logic 52. The central processor uses one of three methods to generate the next firmware address. The first method uses bits 54 through 63 of the control store word to form the next address. These bits comprise a 10-bit next address (NA) field that can directly address any one of the potential 1024 control store locations. The second method obtains the next address from PROM chips that contain several preassigned addresses. The address selected is determined by a decode of the F register 36 contents, the control store outputs, and other control flip-flops 54. The third method is to invoke the subroutine return (link) register 51.

Figure 2:
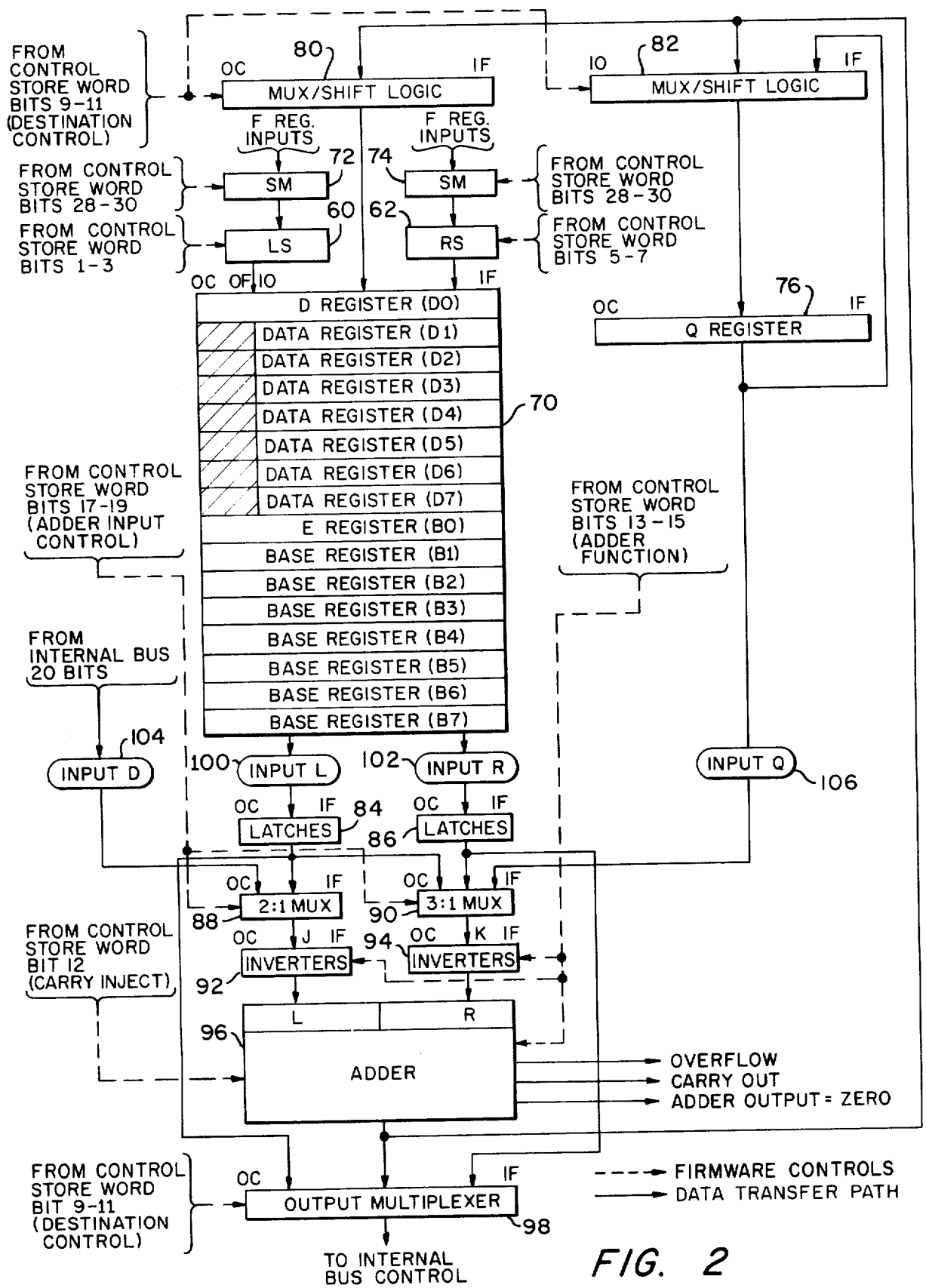
FIG. 2 provides a general block diagram of the microprocessor logic utilized in the data processor shown in FIG. 1.

Also included in the data processor is a register and logic unit (RALU) 12 which is sometimes referred to as the microprocessor. FIG. 2 is a block diagram of the RALU 12 illustrating the details thereof. In general, the RALU is divided into four areas which include a register file, shift logic, arithmetic logic and control logic. The register file includes data registers, working registers and base registers. The shift logic is used during shift operations and normal transfers of data. The arithmetic logic includes various latches or buffers, multiplexers, inverters and an adder unit. The control logic of the RALU includes selector logic for selecting that portion of the data to be operated upon.

The central processor for the present invention includes various registers, some of which are not essential to the present invention but which will be generally discussed for background purposes. The status/security register 14 (FIG. 1) contains the system status and security keys. This register includes bit fields which indicate whether or not the system is in the privileged state or whether it is in the user state. During the user state, specified instructions will enter a so-called trap routine instead of being executed. Further, when the memory protection feature of the segmentation and protection unit 17 is enabled, it scrutinizes each address to determine whether this user is permitted access to this location for the purpose intended: read, write or execute. The register 14 also includes a field for indicating the i.d. number of the processor, and is set during system configuration. The register 14 also includes a field for indicating the interrupt priority level of the central processor. All devices coupled in the system include an interrupt level. The current running program in the central processor will be interrupted if the device includes a level number which is lower than the actual level number of the running program wherein the lower level number indicates a process and/or device which is least interruptable. Such interrupt structure is shown in U.S. Pat. No. 3,984,820, issued on Oct. 5, 1976.

The indicator register (I) 16 contains the overflow and program status indicators. This register 16 also includes various fields among which are included fields for indicating the results of any comparison which has made in the system, and indication or status of the last peripheral device which was interrogated, and a field to indicate the state of the last bit tested.

Seven M registers (M1 through M7) are contained within random access memory (RAM) 13 which is by way of example 16 words of 20 bits each as illustrated in FIG. 1A. The M1 and M2 registers control central processor features. The M4 and M5 registers control features in the optional scientific instruction processor. The M3, M6 and M7 registers are reserved for future use. The seven M registers are in RAM 13 locations 1 through 7 as illustrated in FIG. 1A. The M1 register contains trap enable mode control keys, which include a field for enabling a trace trap (i.e., a trap which assists in tracing a computer program's operation) for jump and branch instructions. The M2 register contains stack/queue control bits which enable the use of base registers 6 and 7 in a stack or queue mode. Since the M register contents are stored in the RAM 13, they are not easily accessable to test logic 50. Therefore, a M collector register, not shown in FIG. 1, is used to collect the pertinent bits that the central processor requires in order to make instantaneous decisions.

The program counter (P register) 20 is by way of example a 20-bit register which normally contains the address of the instruction currently being executed. The Y register 22, i.e., the memory address register, is also by way of example a 20-bit register that normally contains the address of data to be accessed in memory. The interrupt register (IN) 21 is by way of example a 16-bit register that receives the channel number and level of the interrupting device from the receiver logic 26-R. The bus data register (DT) 23 is by way of example a 16-bit register that generally receives operand data from the receiver logic 26-R for distribution throughout the central processor via internal bus 28. The procedure 1 (P1) and procedure 2 (P2) registers 25 and 27, are by way of example 16-bit registers that generally receive procedure words from the receiver logic 26-R that result from central processor requests for a double-word fetch of procedure from memory.

The XB register 32 is by way of example a four bit register that is used for bit and byte indexing within the processor. The output of this register 32 is coupled to both the internal bus 28 and the hexadecimal decoder logic 34. The instruction register (F) 36 is by way of example a 12-bit register that holds the most significant 12 bits of the instruction word as it is received from a memory which may be coupled to the external bus. The select register (SEL) 37 stores the least significant 4 bits of the instruction word. It can be loaded from the internal bus 28 without altering the most significant 12 bits (F register) of the instruction word. The SEL register 37 may also be decremented and tested for zero. The term F register 36 will be used hereinafter to described the combined instruction (F) register and select (SEL) register which form a 16-bit register unless it is important to distinguish between the 12-bit F register 36 and 4-bit SEL register 37.

The constant generator logic 40 is coupled to provide specific constants to the tri-state selector 42 for use in association with the processor's firmware included within control store 10. The counter register (CTR) 33 is by way of example a 4-bit register that counts the number of instruction words processed in the current instruction. Its value is reported in the trap status word generated by trap status logic 35. The trap status logic 35 includes logic by which bus cycles that would otherwise last indefinitely are terminated, thereby notifying the initiator that the party being called is not connected. When processing traps, the central processor generates addresses to dedicated memory locations that contain a pointer to the next available trap save area and to a trap vector (i.e., pointers to the trap handler procedures). The hexidecimal decoder logic 34 consists of a 4-bit to 16-bit demultiplexer that is used to generate a mask for bit and other operations (i.e., one out of sixteen bits is selected for testing by the firmware included in control store 10). The H register 41 is by way of example a 16 bit register that facilitates byte operations by swapping the least and most significant 8 bits when depositing its contents onto the internal bus 28. The tristate selector 42 collects data from a selected central processor element for routing to a specific central processor element, for example, from the internal bus 28 to the RALU 12 or vice versa. Control store bits 22 through 27 are utilized to gate the contents of the selected central processor registers onto the internal bus 28 via the tristate selector 42 with only one input (selected register) enabled for transfer at any given time.

Communications with the operator of the central processor is provided by a self-contained control panel. The control panel logic 29 is connected to internal bus 28 which is used to transfer data between the control panel and the central processor. The control panel provides the user with the unique central processor controls, visible status indicators, and registers that allow the operator to interrogate and analyze system performance or malfunction. The bootload PROM 15 consists of by way of example 512 16-bit locations that contain the standard bootload routines. When the optional segmentation and protection unit 17 is installed, all addresses that reside in the internal processor registers, for example the Y register 22, are reinterpreted before taking part in a memory reference. Internal processor addresses are called virtual addresses; addresses after interpretation by the segmentation and protection unit 17 are called physical addresses. Two steps are required to convert a virtual address into a physical address: (1) perform the virtual to physical mapping, and (2) determine, based on current processor states, whether this memory reference is permitted. Segments are sections of virtual memory space. Each segment is defined by a pattern, of by way of example 32 bits, stored in the segmentation and protection unit 17. The segmentation and protection unit 17 performs two types of checks each time it converts a virtual address into a physical address: (1) a comparison of the read/write/execute permission bits to the intent of this memory access is made and (2) a determination as to whether this virtual address is legitimate. If the segmentation and protection unit 17 disallows the memory reference a privilege violation results.

The internal bus (BI) 28 is by way of example 20 bits wide and primarily used to transfer data between the processor's registers. Memory addresses and data are also transferred to the external bus via the internal bus 28. The address bus register (BA) 56 is by way of example 16 bits wide and is used to transfer the addresses for the input and output and memory read or write cycles to the logic 26-R and T. The BA register 56 selects, under firmware control, the Y register 22 for data references or the P register 20 for procedure references. The transceiver logic 26 (26R and 26T) includes logic circuitry which constitutes the only interface between the central processor and the external bus. All data, address and interrupt signals must pass through the transceiver logic 26. Such transceiver logic 26 as well as the operation of the external bus is described in U.S. Pat. No. 3,993,981, issued on Nov. 23, 1976 and incorporated herein by reference.

The select modifier logic (SM) 58 determines which bits of the F register 36 (if any) are used to modify the register file selection performed by the LS and RS fields, i.e., the left select and right select fields of the control store word of control store 10. The SM logic gates F register bits 01 through 03, 09 through 0B, SEL 1 through 3, or SEL 0 through 3, depending upon the configuration of control store bits 28 through 30 to both the left and right selector logic, i.e., LS logic 60 and RS logic 62. The LS and RS logic uses the selector modifier 58 output and the contents of control store bits 1 through 3 or 5 through 7 for register selection. Control store bits 1 through 3 are used by the left selector. Control store bits 5 through 7 are used by the right selector.

The external bus provides a common communication path or interface among all units, including memory, of the system as shown in U.S. Pat. No. 3,993,981, issued on Nov. 23, 1976. The external bus is asynchronous in design and units of varying speed are operated efficiently on the system with three types of communication permitted, namely, memory transfer, input/output transfers and interrupts. The external bus may have coupled thereto the central processor, a memory unit, peripheral device controllers, communications controllers and the like. The above noted registers, etc., are further described in a Honeywell Information System Inc., publication dated January, 1976, entitled "Honeywell Level 6 Minicomputer Handbook", order number AS22.

Bus control 48-R and 48-T control the interface of the CPU with the external bus 26. Bus control 48-R, for example, controls whether the data received on the data lines is gated into the: interrupt (IN) register 21, data (DT) register 23 or procedure 1 and 2 (P1 and P2) registers 25 and 27. Bus control 48-T, for example, controls the requesting of the external bus for use by the CPU or the acknowledging of the data received from another device on the external bus.

Now referring to FIG. 2, the register and logic unit (RALU) 12 is illustrated in detail. RALU 12 may comprise five AM2901 microprocessors manufactured by Advanced Micro Devices, Inc. and described in their publication "The AM2900 Family Data Book", copyrighted 1976 and incorporated herein by reference. RALU 12 is divided into four basic areas, more particularly a register file, shift logic, arithmetic logic and control logic. First referring to the register file 70, it includes the data registers D1 through D7, the working registers D0 (or D) and E, and base registers B1 through B7. Registers D1 through D7 are by way of example 16-bit word operand registers with bit 10 being considered the most significant bit. Within the actual implementation of the present invention, registers D1 through D7 are 20-bit registers with the least significant 16 bits being used to hold operands and the most significant 4 bits (bits OC through OF) being ignored. Registers D and E are also by way of example 20-bit registers (bit 0C through 0F and 10 through 1F) and used for manipulating data during firmware operations. During instruction fetch and control panel operations the register D is used to hold a copy of the contents of the instruction register (F) 36. The base registers are by way of example 20-bit address registers that can be used for formulating addresses by pointing to any procedure, data or arbitrary location in the system with bit 0C being considered the most significant bit. The base registers also have an auto increment and auto decrement capability to allow easy use of these registers for stacks, queues and program loop operations. It should be noted that those registers that contain operands (registers D1 through D7) are 16-bit registers whereas those registers that can contain addresses (registers D, E and B1 through B7) are 20-bit registers.

Multiplexer shift logic 80 and 82 primarily include two 16-bit multiplexers that are used for both shift operations and normal transfers of data. An additional register (Q) 76 is provided for double operand shifts. Although the Q register is a 20-bit register, only its least significant 16 bits are used during double precision shift operations. Data can be shifted left or right by one bit between the multiplexers and any data register within the register file 70. In the present invention, Y register 41 normally includes an unindexed address and the D register (D0) includes an index value.

The arithmetic logic is comprised of two 20-bit latch circuits 84 and 86, a two-to-one multiplexer 88, a three-to-one multiplexer 90, two 16-bit inverters 92 and 94, adder unit 96 and an output multiplexer 98. The latches associated with input L 100 receive data from the register file 70 as selected by the left selector logic 60. Similarly, the latches associated within input R 102 receive data from the register file 70 as selected by the right selector 62. Outputs from latches 84 feed both multiplexers 88 and 90 and the output multiplexer 98. Outputs from latches 86 feed multiplexer 90. The left-hand multiplexer 88 receives data from the internal bus 28 via input D 104 and the latches 84 associated with input L 100. The right-hand multiplexer 90 receives data from the Q register 76 via input Q 106, from the latches 86 associated with input R 102 and from the latches 84 associated with input L 100. The outputs J and K respectively from these multiplexers are fed through inverters 92 and 94 respectively to the respective L and R inputs of the adder unit 96. The adder unit 96 provides all arithmetic operations. In addition to the L and R inputs, an additional input is provided from control store word bit 12 (carry inject). The adder 96 output is fed to both the output multiplexer 98 and the input multiplexers/shift logic 80 and 82. The 20-bits of data from output multiplexer 98 is the main output from the RALU 12. Data from the output multiplexer 98 is provided to the internal bus 28 for distribution throughout the processor.

The following is a further discussion with respect to the processor and operation that is depicted in FIGS. 1 and 2. The central processor is organized around a single internal bus 28 which connects most of the processor logic to each other and to the external bus via receivers 26-R and transmitters 26-T. As indicated hereinbefore, the Y register is the memory address register and the F register 36 is utilized to receive an instruction word during instruction fetches. The various bits on the internal bus 28 are used as inputs to the test logic 50 for use in making firmware branching decisions. The information contained in such various bits from the internal bus 28 can be stored in the test logic 50 and any one of various hardware control flip-flops 54. The internal bus 28 is also an input to the RALU 12.

The internal bus 28 is driven or controlled by several elements including the constant generator 40 which operates under firmware control, the RALU 12, the byte selection register (XB) 32 which is loaded by a shifting from the RALU 12.

The current control store instruction is available at the output of the control register 11 and is partially decoded with various logical elements and is then used to provide operations with respect to the remaining elements in the system. The next address generator logic 52 utilizes the next address field in the control store word, i.e., the firmware word and generates a new address dependent thereon and dependent upon test conditions provided by test logic 50. The control store 10 advances to the next address once per central processor clock cycle which may be in the order of a few hundred nanoseconds.

Figure 3:
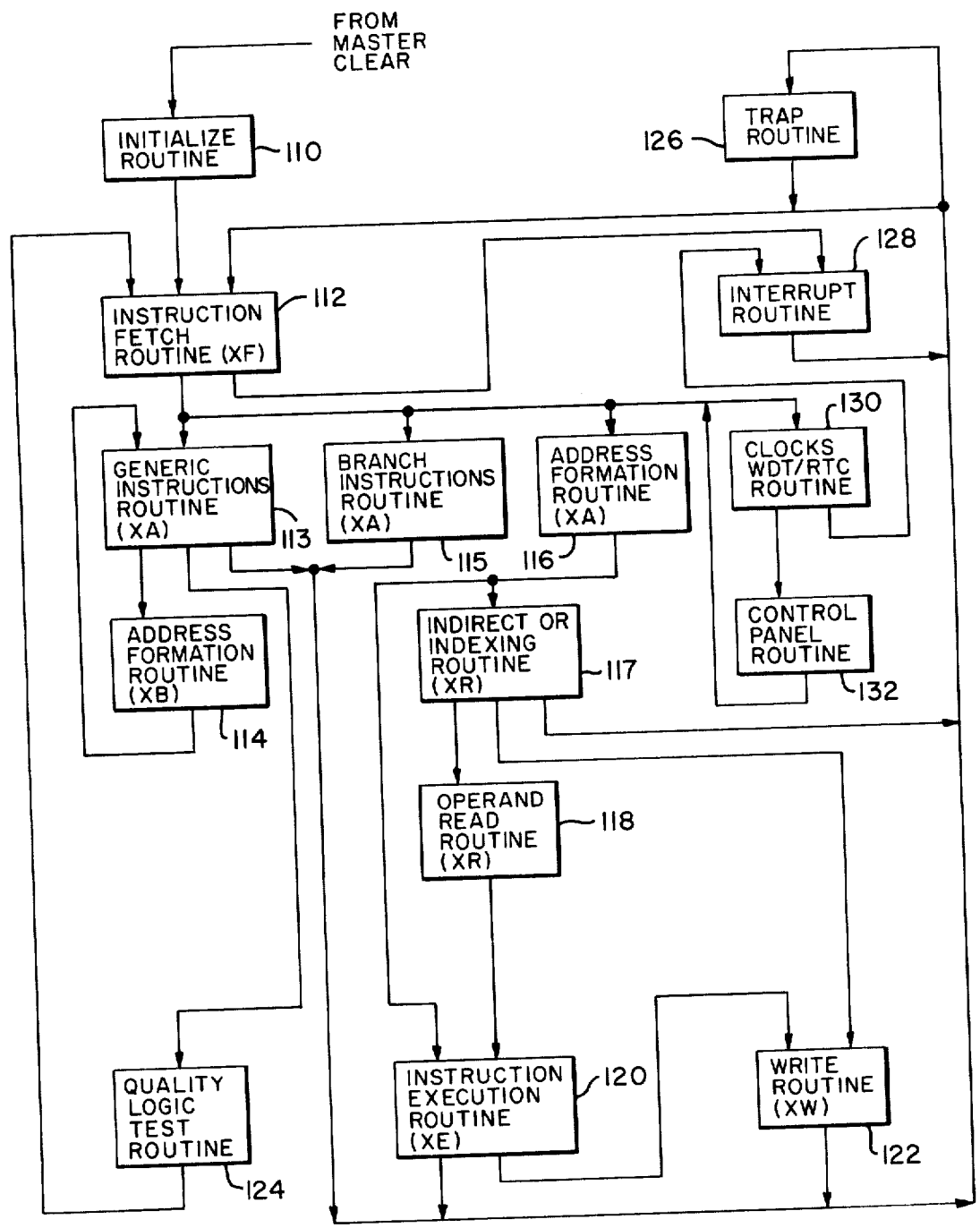
FIG. 3 illustrates in general block diagram form the firmware routines provided in a control store included in the data processor of FIG. 1.

As shall be further discussed with respect to FIG. 3, branching in the firmware, i.e., the control store is detected by the test logic 50, which uses the contents of the internal status flip-flops 54, the state of the internal bus 28 and the contents of the F register 36 to decide whether any test condition is satisfied or not. This test condition is an input to the next address generator logic as indicated hereinbefore. This test condition also is utilized to select two forms of address generating during various types of branching operations. The XA branch which selects among the entry points in the firmware for the various type of address formations makes a decision based largely upon the contents of the F register 36. The XR branch concerned with fetching operands from memory has its entry points decided to a large extent on the opcode field of the F register 36. By way of further example, the XE branch is based almost exclusively upon the opcode of the instruction and is enabled by the opcode bits of the F register 36. The XW branch which is the branch which decides the manner in which the operand is written back into the memory is performed on the basis of the opcode type and upon the internal status of flip-flops 54.

Shifting of the index registers is provided for certain types of addressing and is accomplished by shifting the index value stored in the index register, usually the D register, of the register file 70. During indexing, bits are shifted out either left or right depending on the operation.

The control flip-flops, i.e. the hardware flip-flops 54 which for purposes of describing the present invention need not be shown in detail, include several flip-flops. One is used to keep track of whether or not the instruction currently being executed is a memory reference instruction or not. The FFSIGN flip-flop is used to sign extend 16-bit address values to 20 bits. The FFWRAP flip-flop is used to remember that the computed address is invalid. Another is used to store the fact of whether or not the output of the RALU 12 was a zero at some previous time.

As indicated hereinbefore, the F register 36 is actually a 12 bit static register (instruction (F) register 36) and a 4 bit dynamic counter (select (SEL) register 37). The four right hand bits in SEL register 37, i.e. bits 12 through 15 are used as a counter which can be counted down toward zero and whose contents can be tested for use by the next generation address logic. This is used to count shifts, i.e. the SEL register 37 is loaded with the shift distance when a shift is being executed. It is also used for the loops which save and restore the registers in memory to count successively through the 16 registers in the register file 70.

The test logic 50 includes a plurality of selectors enabled by various control store and opcode conditions and generally performs those tests which are used with the firmware for making decisions during firmware execution.

Logic 80 and 82 (FIG. 2) are that portion of the RALU 12 which can either provide, i.e. transfer, the output of the adder 96 into register file 70 or into Q register 76, or provide the output of the adder 96 shifted one bit to the left or shifted one bit to the right. The logic 80 is coupled directly into the registers in register file 70. If the input to register file 70 is shifted either one bit to the right or one bit to the left, then the appropriate shift input will be provided from the output of adder 96 to supply the missing bit, and the other bit will be transferred out. The D register (DQ) included in register file 70 is that register which maintains the index values.

Left selector logic 60, right selector logic 62 and the selector modifier logic 58, which includes logic 72 and 74, also comprise part of the control logic of the RALU 12. The output of the selector modifier 58 along with the control store bits 1 through 7, determines the output of the left and right selectors 60 and 62, respectively. Control store bits 9 through 19 control the following areas of the RALU 12 logic: bits 9 through 11 control the input and output multiplexers 80, 82 and 98; bit 12 controls the carry inject of adder unit 96; bits 13-15 control adder unit 96 plus inverters 92 and 94; and bits 17 through 19 control the multiplexers 88 and 90. Control store bit 16 controls whether the RALU is to manipulate two 20-bit operands or one 16-bit operand and one 20-bit operand as described hereinafter with respect to FIG. 2A.

Figure 2A:
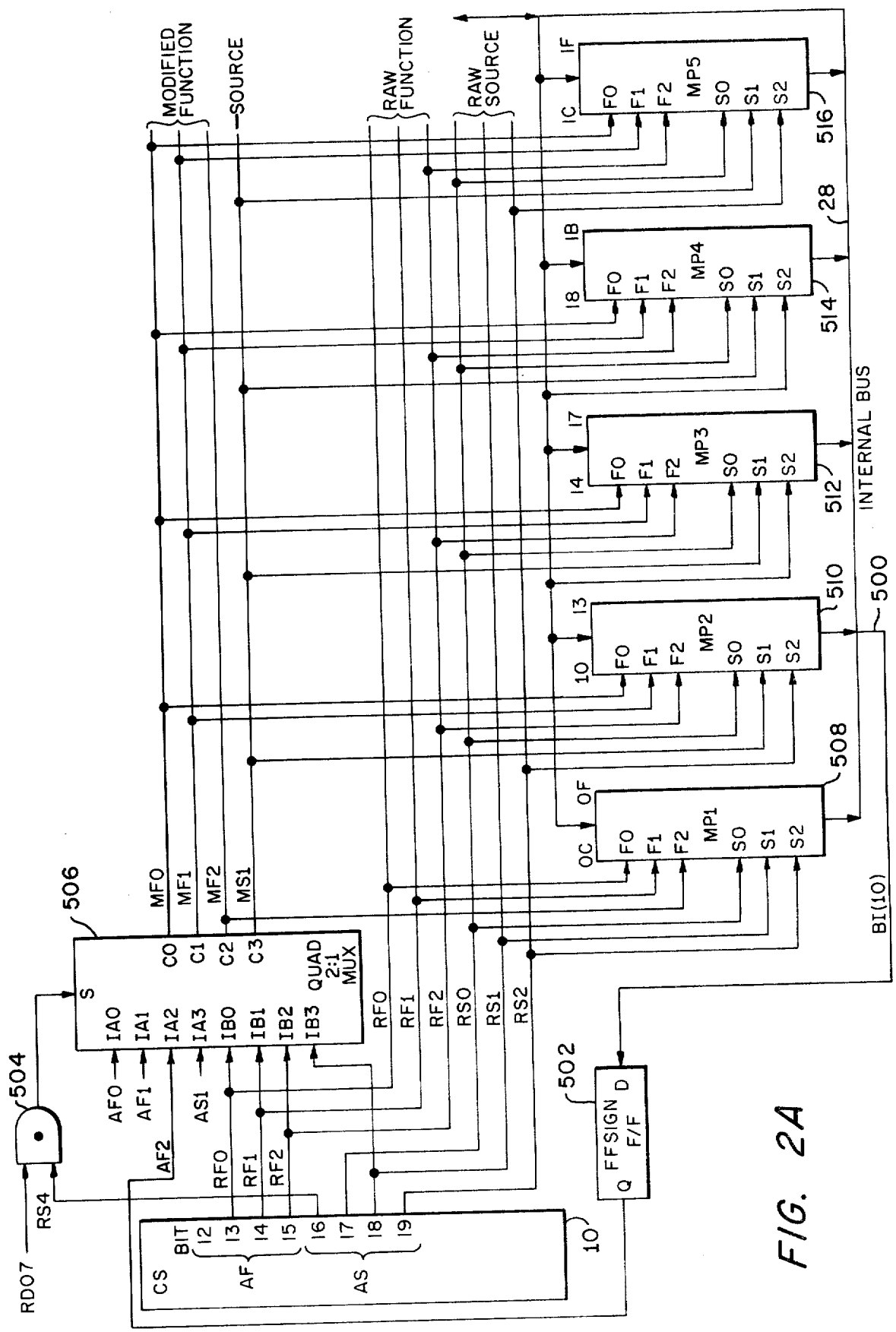
FIG. 2A provides a general block diagram of an arrangement in which five 4-bit microprocessors are cascaded together to form the 20-bit microprocessor shown in FIG. 2.

Now referring to FIG. 2A which illustrates the manner in by which the five 4-bit microprocessors are cascaded together to form the 20-bit microprocessor illustrated in FIG. 2, the microprocessor is hereinafter described. Microprocessors MP1 through MP5, elements 508 through 516, are connected to internal bus 28 such that each can receive four bits of data from internal bus 28 and output four bits of results onto internal bus 28. For example, microprocessor 1 (MP1) receives bits 0C through 0F from the internal bus and places bits 0C through 0F onto internal bus 28.

The microprocessors utilized in the preferred embodiment of the present invention are primarily controlled by nine bits of information. A 3-bit source field with the inputs designated S0 through S2 in FIG. 2A is used to select one of eight sources for one operand to be manipulated by the microprocessor. The second 3-bit field is the function field which indicates what arithmetic operation is to be performed by the microprocessor and these three bits are designated F0 through F2 in FIG. 2A. The third 3-bit field designates the destination of the result produced by the operation of the microprocessor and these three bits are not shown in FIG. 2A. As discussed hereinbefore, control store bit 16 controls whether the RALU is to manipulate two 20-bit operands or one 16-bit operand and one 20-bit operand. The method by which this is done is illustrated in FIG. 2A. The quad two-to-one multiplexer 506 is used to select between raw or alternative function and source signals to be input to the control fields of microprocessors MP1 through MP5. If the selection signal at the output of AND gate 504 is a binary ONE, the multiplexer 506 selects the multiplexer inputs IB0 through IB3 and places them on the multiplexer outputs C0 through C3 respectively. In this case, it can be seen that the multiplexer output on line MF0 will be RF0 (raw function bit 0), the output on line MF1 will be raw function code bit 1 and the output on line MF2 will be raw function code bit 2, and the output on line MS1 will be raw source code bit 1. As discussed hereinafter with respect to FIG. 4, the control store bits 12 through 15 constitute the RALU function (AF) field and are used to control the function performed by the microprocessors. Control store bits 16 through 19 are the RALU source (AS) field and are used to control the source input to the microprocessors. Thus it can be seen by examining FIG. 2A, when the B inputs to multiplexer 506 are selected by a binary ONE on the output of AND gate 504, the source and function fields of each microprocessor are controlled by the AF and AS fields of the microword from the control store 10 and two 20-bit operands are manipulated with each 4-bit slice having the same function performed upon it. Alternatively, the alternate function and source bits may be selected by the output of AND gate 504 being a binary ZERO in which case inputs IA0 through IA3 are transferred to the multiplexer 506 outputs C0 through C3 respectively. In this case, microprocessors MP2 through MP5 receive their function bits F0 and F1 from the modified function bits MF0 and MF1 respectively and microprocessor MP1 receives its function bits F0 through F1 from the raw function bits of control store 10 on lines RF0 and RF1 respectively. MP1 also receives a modified function bit 2 (MF2) from the output of multiplexer 506 whereas microprocessors MP2 through MP5 receive their function bit 2 from the raw function bit 2 on line RF2 directly from control store 10 bit 15. Similarly, when the A inputs to multiplexer 506 are selected by a binary ONE signal at the output of AND gate 504, microprocessors MP2 through MP5 receive their S1 source signal from the MS1 line on the output of multiplexer 506 and their S0 and S2 source signals from the raw source signals RS0 and RS2 directly from the control store bits 17 and 19 respectively. It is noted that microprocessor MP1 always receives its source bits S0 through S2 directly from bits 17 through 19 of the control store 10.

By controlling the five 4-bit microprocessors in this manner, with microprocessor 1 being controlled by one set of control signals and microprocessors MP2 through MP5 being controlled by another set of control signals when the alternate signals are selected via multiplexer 506, it is possible to have the microprocessor operate on a 16-bit operand and a 20-bit operand without first having to sign-extend the 16-bit operand four bits to the left. That is, by controlling the microprocessors in this manner the 16-bit operand can be automatically sign-extended into its four most significant bits without requiring one or more separate microinstruction steps to extend the sign of the shorter of the two operands. It is noted that the most significant bit of a 16-bit operand, i.e., bit 10 (BI(10)), is used to set the sign flip-flop (FFSIGN) 502, the output of which is fed into the A inputs of multiplexer 506 as alternate function bit 2 on line AF2. It is further noted, as will be discussed hereinafter, that control store word bit 16 of the AS field is an input into AND gate 504 and, when a binary ONE, partially enables AND gate 504 to select the alternate function and source control bits for microprocessors MP1 through MP5. That is, control store bit 16 partially controls whether two 20-bit operands are to be operated on; or whether one 20-bit and one 16-bit operand are to operated on by the micro-processors. The other inputs to AND gate 504 is signal RDO7 which when a binary ONE indicates that the operation will operate on an operand contained in data registers D0 through D7. It is noted that signals AF0, AF1, AF2 and AS1 are chosen such that they effectuate the sign extension of 16-bit operands into 20-bit operands. The generation of these signals is not shown in FIG. 2A but it is readily understood by those skilled in the art how they can be generated through the use of control store and other central processor signals. For example, to add a 16-bit indexing value to a 20-bit base address, the 16-bit indexing value is sourced into bits 10 through 1F (MP2 through MP5) and either four binary ZEROs or four binary ONEs are sourced into bits OC through OF (MP1) depending on whether the sign (bit 10) of the indexing value is positive or negative.

As indicated hereinbefore, the control store 10 is comprised of a plurality of firmware words for use in controlling various operations within the processor. FIG. 3 provides an overview diagram of such firmware and shows all major branches between the major firmware routines. The following is a general description thereof. More specific details of such firmware with respect to the present invention are provided hereinafter.

The initialization routine 110 is entered following a master clear of the system. This routine clears various ones of the processor registers, flip-flops, RAM 13 and determines whether or not the control panel is locked, i.e, whether all control panel switches, etc., are disabled; the control panel being another element which may be included in the processor, but which is not essential to the operation thereof, and which is not shown herein. If the control panel is locked, a branch is performed through the instruction fetch routine 112, otherwise the control panel routine 132 is entered. The instruction fetch routine 112 is used to obtain the next instruction, for execution. Once the instruction is received from memory, it is loaded into the instruction register (F) 36. A copy of the instruction is written into D0 for the control panel service routine and into RAM0 in case a trap occurs. During the XF routine, checks are performed for the following conditions: (i) external processor trap, (ii) watchdog timer or real time clock service required, (iii) device interrupt, or (iv) control panel unlocked. If any of such condition are encountered, a branch is performed for the appropriate routine; otherwise an address routine (113, 115 or 116) is entered.

The address routines start effective address generation. The address routine is subdivided into three routines 113, 115 and 116. Generic instruction address routine 113 is used to fully execute generic instructions, for example a halt instruction, although instructions to be executed by the optional commercial instruction processor invoke address formation routine 114. Branch instruction address routine 115 is used for branch instruction address formation. Address formation routine 116 is used for address formation for non-branch and non-generic instructions. If the effective address is a register or if the operand is immediate, address formation routine 116 calls instruction execution routine 120; otherwise it calls indirect or indexing routine 117.

The indirect or indexing routine 117 performs indirection, indexing and stack/queue limit checking. The operand read routine 118 fetches an operand if the instruction requires it. Some instructions, such as jump instructions, are executed within the operand read routine 118. The execution routine 120 creates one of several operation code dependent entry points where the instruction is executed. The write routine 122 stores the results after the instruction is executed. This routine is only entered when the executing instructions must return their results to a place specified by an address syllable. Nine entry points are available. The particular entry point used is based on whether or not the result goes to memory or a register, whether the result is an address or data and whether it is a half-word or full-word operand instruction.

The trap routine 126 is entered from any one of many locations within the firmware when a trap condition is detected. Generally, traps are either expected or unexpected. Expected traps, for example, references to unimplemented instructions, can be manipulated, but those resulting from error conditions, for example uncorrectable memory errors are usually unrecoverable. The interrupt routine 128 is entered from a number of sources, depending on the operation currently being performed by the central processor. Such sources may include, for example the following: use of a last trap save area, programmed interrupt, external device task completion, real time clock run-out, watchdog timer run-out, or incipient power failure. The clock's watchdog timer and real-time clock routine 130 is entered every 5 milliseconds and the level accounting timer are updated, if enabled. Once these tasks are performed, the control panel routine 132 is entered. The control panel routine 132 is entered, for example, every 8 milliseconds to interrogate the control panel interface to determine whether the operator wishes, for example: a new display, a register change, a memory read, a memory write or a single execution. Some of these operations are not permitted when the central processor is in run mode. Also provided is the quality logic test routine 124 which provides a basic confidence test of the central processor and memory logic.

Thus, the nine major branches, i.e., the XF, the three XA, XB, the two XR, XE, and XW branches are, in summary, used follows: the XF branch is used to fetch the instruction from memory and load it into F register 36; the XA branch 113 is used for the address formation and execution of generic instructions; the XB branch is used for commercial instruction processor instruction address formation; the XA branch 115 is used for branch instruction address formation; the XA routine 117 is used for non-branch and non-generic instruction address formation; the XR branch 117 is used for indirect and indexing address formation; the XR branch 118 is used to read an operand based on the decode of the F register; the XE branch 120 is used to collect among the various subroutines and execute the actual processor instructions; and the XW branch 122 is used when it is necessary to store an operand after execution of the instruction.

The firmware word control format is illustrated in FIG. 4. As can be seen, the firmware word is divided into fourteen fields. Each of these fields controls a different portion of the hardware logic as shown in FIGS. 1 and 2 and other figures. The bits comprising the field are also illustrated in FIG. 4. For example, the LS field consists of bits 1 through 3 of the firmware word. The following is a description of each of such fields and the general use thereof.

The left select (LS) field consists of bits 1 through 3 of the firmware word. This field serves a dual purpose. Along with the select modify (SM) field, it provides a 4-bit address for selecting one of 16 locations in RAM 13 and selecting one of the 16 registers 70 in RALU 12. The selection so performed by the LS field is subject to modification by the SM field. The LS field is used only during read operations. Since the LS field is only 3 bits long and since 4 bits are required to fully address either the RAM 13 or the RALU 12, one bit must be created. The 2-weight bit, which is not in the firmware word, is created from the presence of either the 4-weight or 1-weight bits. The right select (RS) field consists of bits 5 through 7 of the firmware word. Only three bits reside in control store, thereby requiring the 2-weight bit be created as in the LS field. The RS field provides a 4-bit address to the right select input 62 to transfer an operand to the right latches 86 within the RALU. The RS field is used for both read and write operations. If data is to be written into the register file 70, RS selects the location into which the new data is to be loaded. As in the RS field, SM is utilized to determine the address delivered to the RALU's right select input 62. The central processor-pac (CP-PI) field (bits 0, 4 and 8) determines: which portion (if any) of the RALU 12 will be placed onto the internal bus 28; whether the RAM 13 will be transferred to the internal bus 28; or whether the data currently on the internal bus 28 will be written into the RAM 13. The RALU destination (AD) field (bits 9 through 11) determines whether the RALU output will be shifted right, left, or not at all. The AD field also controls whether this value will be written into the RAM 13, the Q register 76 or the register file 70. The RALU function (AF) field (bits 12 through 15) controls the type of operation that will be performed on the two operands, J and K, at the output of multiplexers 88 and 90. The J operand, which consists of data from the internal bus 28 or the register file left latches 84, or the register file right latches 86, is also selected at the source multiplexer of the RALU. Fourteen different logical functions may be performed (e.g., ADD, OR, AND, etc.). The most significant bit (bit 12) of the AF field controls the adder 96 input carry. The RALU source (AS) field (bits 16 through 19) controls which pairs of operand (internal bus 28, register files left latches 84, register file right latches 86, or Q register 76) will be designated as the J and K inputs to the adder 96. The most significant bit of the AF field (bit 12) may alter one or both of the operands to become a 16-bit sign-extended value.

The processor clock (CK) speed control field (bits 20 and 21) permits the processor clock to operate at one of four speeds, by way of example at intervals of 160, 180, 200, or 280 nanoseconds. The duration of each firmware step is thereby controlled by the CK field. The internal bus (BI) selector control field (bits 22 through 27) performs four functions: generates firmware constants (9-bit sign-extended); selects which register 70 is to be delivered to the internal bus 28; determines which signal will be sampled by the indicator register 16; and generates control words to communicate with external processors. The select modify (SM) field (bits 28 through 30) affects the LS and RS fields equally. When the SM field code is ZERO, the LS and RS codes directly address the left and right register file 70 ports. SM field codes 1, 2 and 6 cause one-of-3 bit groups in the F register 36 and SEL register 37 to be ANDed with the RS and LS addresses, directing the result to the left and right register file 70 ports. SM field codes 3, 5, and 7 create constants that are ANDed with the RS and LS addresses generating unique register file 70 addresses. The address bus (BS) control field (bits 31 through 35) performs three functions: initiates address bus cycle; controls the loading and incrementing of both the memory address (Y) register 22 and program counter (P) register 20; and when data is requested from the memory or when the input/output data has not yet arrived, the BS field stalls the central processor clock until the memory request is satisfied.

The general purpose (GP) micro operation field (bits 36 through 41) generates a total of 64 micro operations. The 64 micro operations are classified into 4 groups. The first group affects the FFSIGN, ZERO and other flip-flops 54 as well as the XB register 22. The second group affects the F register 36, SEL register 37 and H register 41 as well as the FFMISC control flip-flop. The third group affects the bootstrap and address wrap-around control (FFWRAP) flip-flop, as well as the S register 14, the M collector, and link register 51. The fourth group are used for control panel functions.

The test condition (TC) field (bits 42 through 47) samples one of 64 unique signals on which the firmware may branch. The branch type (BR) field (bits 48 through 51) select the address source that is chosen to produce the address of the next firmware step. Each firmware step contains a test condition, yielding satisfactory (true) or unsatisfactory (false) test condition results. The BR field presents two addresses from which the true or false condition must be selected. Among the address sources from which BR selects, the next address (NA) field (bits 53 through 63) is frequently used as coded in the control store or with its two least significant bits true, i.e., equals to a value of 3. Control store word bit 52 is not used and is reserved for future use.

The following is a detailed description of the instruction fetch routine 112 and the address routines 113, 115, and 116 of FIG. 3. With reference to FIG. 5 (FIGS. 5A through 5D), the instruction fetch routine includes blocks 200 and 202. The remaining blocks in FIG. 5 represent a portion of the XA routine. Each of the rectangular blocks shown in FIG. 5 represents the operation provided in response to a firmware word from control store 10. The decision boxes are actually included as a part of the immediately preceding rectangular box but have been shown separately for ease of understanding. Various registers are utilized in the XF and XA routines. The following is a general description of such registers, some of which discussion may be repeated for purpose of convenience. The P register 20, ie., the program counter, contains the address of the instruction currently being executed. The output of program counter 20 is coupled to the internal bus 28. Since a single instruction may occupy more than one memory word, the P register is incremented as each instruction word is pulled from memory by the firmware with the P register 20 thus being kept pointing to the next procedure word to be used. The counter (CTR) 33 is used to keep track of how many memory words the current instruction occupies so that the P register can be backed up to point to the first word of an instruction if a trap occurs because of some invalid condition discovered during the execution of the instruction; for example, if the instruction address points to a non existent memory location. The Y register 22 is the operand address register and temporarily contains the address of the operand pointed to by the instruction being executed. The H register 41 is used to interchange the left and right bytes of a word; for example, in half word read or write operations; and to temporarily hold the first word of a LAF address until the second word can be retrieved and the four least significant bits in the H register are concatenated with the 16 bits of the second word to form a 20-bit address. The E register contained in the register file 70 in the RALU 12 is a working register that is used for manipulating data during firmware operations. During indexed operations, the E register includes the index value. The Q register 76 is also included in the RALU 12 and is provided for double operand shifts and typically includes the unindexed address. The F register 36 is the instruction register and holds the instruction word as it is received from memory. The D register is included in the register file 70 and is a working register, i.e., is used for manipulating data as is the E register. The XB register 32 is a four bit register that is used for bit and byte indexing within the processor. The output of this register is coupled to the internal bus 28 and the hexadecimal decoder logic 34. Other elements will be generally described during the following discussion.

Now with reference to the instruction fetch routine, i.e., the XF routine, upon receipt of a word of procedure from the memory, the operation indicated in block 200 will be provided. As indicated in block 200 there will be no operation until the word of procedure is so received. This is indicated by the word PSTALL. A procedure memory read cycle initiate (PMRCI) was performed in the initialization routine 110 prior to entering the instruction fetch routine 112. A discussion of how instruction (procedure) words are fetched from memory and gated to procedure (P1 and P2) registers 25 and 27 and how data (operand) words are fetched from memory and gated to the data (DT) register 23 can be found in the U.S. Patent Application Ser. No. 867,266 entitled "System Providing Multiple Outstanding Information Requests", by Richard A. Lemay, et al., filed Jan. 5, 1978 and incorporated herein by reference. Once the word of procedure has been received, the program counter, i.e., P register 20, is incremented by one and counter 33 is set to one. A word of procedure from procedure buffer (BP), i.e., P1 or P2 procedure register 25 or 27, is then loaded via internal bus (BI) 28 into RAM 13 location 0 (RAM0), into F register 36 (including SEL register 37), and into the D register. The instruction (procedure) word received from memory is loaded into the D register for use by the control panel service routine 132 and into RAM location 0 for use by trap routine 126 in the case of an external processor trap. The first flip-flop (FFIRST) is set to a binary ONE. FFIRST is primarily used by the XR routine to control the number of times that firmware steps within the XR routine are executed. When the firmware operation represented by block 200 is complete, block 202 is entered. It should be noted that typically there are tests performed between various firmware word executions. For example, at the conclusion of the firmware operation represented by block 200, block 202 will not be entered if for example, there is an external trap or interrupt in which event such request would be serviced. Assuming, however, that block 202 is entered, following a procedure memory read cycle initiate (PMRCI), the program counter 20 is loaded via address bus multiplexer (BA) 56 onto internal bus 28 and into RAM 13 location 8 (RAM8). The contents of the internal bus (i.e., the program counter) is then decremented by one and placed in Q register 76. Thus, in summary, after the operation provided by firmware words 200 and 202, the firmware waits for the receipt of the first word of procedure from memory, the program counter 20 is incremented to point to the next word of data, the counter (CTR) 33 is set to 1 to indicate that one word of procedure has been fetched in the current instruction, the first word of the instruction is put in F register 36, the FFIRST flip-flop is set to 1 for later use by the XR routine, a procedure memory read cycle is initiated which will result in procedure words being fetched from memory if both the P1 register 25 and P2 register 27 are empty, the value of P register 20 is placed in RAM 13 location 8 and the address of the first word of the current instruction is placed in Q register 76. At this point, the address routine 113, 115, and 116 will be entered. By way of example, and with reference to the firmware words represented by blocks 200 and 202, assuming that the program counter 20 address is location 100 in memory, after the operation indicated in block 200, the P register 20 will indicate location 101 and the contents of location 100 in memory are placed in F register 36, the D register, and RAM 13 location 0.

By the operation provided by the firmware word represented by block 202, the contents of the P register are transferred to RAM 13 location 8 which will contain memory address 101, and the contents of the P register minus 1 are placed in Q register 76 which will contain memory address 100 which is the address of the first word of the current instruction being executed.

Continuing with reference to FIG. 5, following the instruction fetch routine 112, the address routines (XA) 113, 115, and 116 are entered. There are different types of address formations which may result depending primarily upon the instruction contained in F register 36. Included in this are global addressing, base addressing, index addressing combined with either global or base addressing, base plus indexed push-pop addressing. Included in the indexed addressing is the manner in which quad word, double word, byte or bit may be individually addressed in memory. Generally, indexed addressing is utilized when it is required to refer to data or an address within an array of homogeneously sized elements. Indirect addressing is used when it is desirable to refer to a location whose address is stored in another location, or two locations in the case of LAF addressing mode. So-called relative addressing is that addressing which utilizes the program counter 20 for addressing of memory, whereas base addressing utilizes a base register included in the register file 70 of RALU 12 to provide addressing of memory. Various types and combinations of addressing are further discussed in a December, 1975, publication of Honeywell Information Systems Inc., entitled "Series 60 (Level 6) Assembly Language GCOS/BES,", order number AS1.

With reference to FIG. 5, the path beginning with block 204 provides the operation with respect to global addressing; the block 214 provides the starting point for global plus indexed addressing; the block 216 provides the starting point for base addressing; the block 218 provides the starting point for base plus indexed addressing; the block 220 provides the starting point for base relative addressing; the block 224 provides the starting point for program counter relative addressing; the block 234 provides the starting point for immediate addressing; the block 242 provides the starting point for immediate addressing when the operation requires a write; the block 256 provides a starting point for pop base addressing; the block 268 provides the starting point for push base addressing; the block 280 provides the starting point for base plus index pop addressing; the block 290 provides the starting point for base plus index push addressing; the block 300 provides the starting point for data register addressing (the operand is contained in a data register); the block 306 provides the starting point for base register addressing (the operand is contained in a base register); the block 308 provides a starting point for positive immediate operands; and the block 310 provides the starting point for negative immediate operands. With reference to global or global plus indexed addressing, and with reference to the operations beginning at blocks 204 and 214, such global addressing may be utilized for those situations in which it is desirable to reference data or an address that is unrelated to the current location addressed by program counter 20. These forms of addressing allow one to reference a location directly or indirectly. Thus with reference to block 204, the clock is stalled until the next word of procedure becomes available from memory. When the next instruction word becomes available from memory, it is taken from the procedure buffer (BP), i.e., the P1 or P2 register 25 or 27, and placed on internal bus (BI) 28 and into H register 41, the E register (D0), and the Y register 22. The program counter 20 is then incremented by one to point to the next word of procedure and by way of the above example, addressed 102. The counter 33 is then incremented by 1 to indicate that two words of procedure have been processed in the current instruction. At the completion of firmware word 204 a test is made to determine whether the processor is in LAF or SAF mode, if in SAF mode the firmware branches to the XR routine with the address of the instruction operand contained in the Y register 22, i.e., the operand address register. Continuing the above example, if in SAF mode the Y register 22 will contain the contents of memory location 101 with the most significant four bits of the 20-bit Y register being set equal to 0. If the results of the addressing mode test of block 206 indicates that the processor is in LAF addressing mode the block 208 is entered. In block 208 a procedure memory read cycle is initiated to replenish the procedure buffer (BP) if it is completely empty. A hexadecimal constant 0FFF0 is placed on internal bus 28 and is then added by the arithmetic logic unit (ALU), i.e., adder 96, with the contents of the E register (referred to in FIG. 5 as B0). This addition is done to test whether the first word of the LAF address contains a binary ONE bit in the most significant 12 bits of the first word of a LAF address. Upon completion of block 208 a test is made in block 210 to see if there was a carry out of bit position 10. A carry out of bit position 10 indicates that the final LAF address would exceed 20 bits in length and therefore be invalid which results in the firmware branching to the routine to handle bad addresses. If the address is valid, block 212 is entered and the clock is stalled until a word of procedure becomes available. Once the second word of the LAF address becomes available, the procedure buffer along with the four least significant bits from the H register are placed on internal bus 28 and into the B0 register (E) and Y register 41. This placing of both the four least significant bits of the H register and the next word of procedure on internal bus 28 results in the concatenation of the four least significant bits of the first word of the LAF address with the 16 bits of the second word of the LAF address resulting in the 20-bit LAF address value being placed in the Y register and the B0 register. The block 212 also increments the program counter 20 by 1, to point to the next word of procedure, and increments counter 33 by 1 to indicate that another word of procedure has been used in the execution of the current instruction. By way of the above example, the Y register and B0 register will at this point contain the 20-bit address composed of the least significant four bits of memory location 101 and the 16 bits of memory location 102, the program counter 20 now points to memory location 103 and counter 33 now contains a 3 to indicate that three words of procedure have been used in the execution of the current instruction. The block 212 then exits to the XR routine.

As indicated hereinabove, the block 214 is entered for global plus indexed addressing. Thus with reference to block 214, a procedure memory reference cycle is initiated to replenish the procedure buffer, if it is empty. The contents of the selected index register (DX), it being noted that there may be three index registers, namely, data registers D1, D2 and D3 are loaded into the D register (D0) via internal bus 28 (BI). Bit 10 on internal bus 28, i.e., BI(10), is loaded into the sign flip-flop (FFSIGN) for later use in the XR routine to extend the 16-bit indexing value in the DX register into a 20-bit value. After centralizing the specified index value into the D register for use by the XR routine, block 214 exits to block 204 which performs the development of the global addressing as discussed hereinbefore. In summary and by way of the above example, if data register 3 (D3) of register file 70 of RALU 12 is the index register specified in the instruction, upon exit from the block 214, the contents of data register D3, i.e., the index value, have been centralized into the D register (D0).

If base addressing is required, then the firmware word represented by block 216 is executed, thus the contents of the specified base register (BB) in register file 70 is transferred to Y register 22 via internal bus (BI) 28. It is noted that there may be seven base registers, namely base registers B1 through B7. After centralizing the specified base register (BB) into the Y register 22, the block 216 then exits to the XR routine. If base plus indexed addressing is required, then the firmware work represented by block 218 is executed. Thus, the contents of the selected index register (DX) are loaded into the D register (D0) of register file 70 via internal bus 28. Bit 10 on internal bus 28, i.e., BI(10), is loaded into the sign flip-flop (FFSIGN) for later use in the XR routine to extend the 16-bit indexing value in the DX register into a 20-bit value. After centralizing the specified index value into the D register for use by the XR routine, block 218 exits to block 216 which performs the development of the base addressing as discussed hereinbefore with reference to block 216.

As indicated hereinabove, the block 220 is entered for base relative addressing. Thus with reference to the block 220, the clock is stalled until the next word of procedure becomes available from memory. When the next instruction word becomes available from memory, it is taken from the procedure buffer (BP) and placed on internal bus (BI) 28 and into the E register (B0). The 16-bit value from the procedure buffer is extended into a 20-bit value by providing four bits of binary ZERO for the four most significant bits. The program counter 20 is then incremented by 1 to point to the next word of procedure and by way of the above example, address 102. The counter (CTR) 33 is then incremented by 1 to indicate that two words of procedure have been processed in the current instruction. Bit 10 on internal bus 28, is loaded into the sign flip-flop (FFSIGN) for later use in the block 222. In summary, the block 220 centralizes the displacement value (BP) contained in the second word of the instruction into the D register and increments the counters past the second word of procedure. The block 222 is entered and the contents of the selected base register (BB) is added to the sign-extended displacement value contained in D0 via the ALU (adder 96) and the results placed into Y register 22 via internal bus (BI) 28. The memory address wrap flip-flop (FFWRAP) is set to the logical exclusive OR of the sign (FFSIGN) flip-flop and the carry bit out of the most significant bit (0C) resulting from the addition of the displacement value to the contents of the base register. The FFWRAP flip-flop is used later to cause a address trap if the address computed by adding the displacement value to the base value exceeds 20 bits of address. The block 222 then exits to the XR routine. In summary the blocks 220 and 222 take the relative value, i.e., the displacement value contained in the second word of procedure of the instruction, and add it to the contents of the specified base register and place the results in Y register 22.

As discussed hereinbefore, the block 224 provides the starting point for program counter and interrupt vector relative addressing. The block 224 provides the same function for program counter relative addressing as discussed hereinbefore with respect to block 220 for base relative addressing. That is, block 224 centralizes the displacement value into the D register and increments the counters past the second word of procedure. Also, part of the operation provided by block 224 is a determination of whether or not interrupt vector relative addressing is required, as indicated in block 226. If there is no interrupt vector relative addressing required, as indicated by examination of the instruction in F register 36, then the program counter relative addressing block 228 is entered. The block 228 performs an analogous function for program counter relative addressing as that provided by block 222 for base relative addressing. That is, in block 228 the displacement value contained in the D register is added to e program counter value contained in the Q register 76 and the result is placed in Y register 22 via internal bus 28. It is noted that the program counter value was placed in the Q register by the firmware step of block 202 discussed above with reference to the instruction fetch (XF) routine. The block 228 also sets the address wrap flip-flop (FFWRAP) as discussed with respect to the block 222. The block 228 then exits to the XR routine. Upon exit from block 228, the program counter relative address is contained in Y register 22. If interrupt vector relative addressing is specified, as indicated by examination of the instruction in F register 36, i.e., decision block 226, then the block 230 is entered. The block 230 is actually composed of five to seven separate firmware steps which result in the placing of the interrupt vector address into Q register 76. The individual firmware steps are not pertinent to the system of the present invention and therefore are not shown. After the interrupt vector address is placed in Q register 76, the firmware step of the block 232 is performed. The operation provided by the block 232 is identical to that provided by the block 228 for program counter relative addressing as discussed hereinbefore with the only difference being that the Q register in block 232 contains the interrupt vector address to which the displacement value contained in the second word of the instruction is added to form the interrupt vector relative address which is placed in Y register 22. The FFWRAP flip-flop is also set in block 232 before it exits to the XR routine. In summary, the operation provided by the block 224 and subsequent blocks is to centralize the displacement value into the D register and then add it to either the program counter or the interrupt vector address and place the result in the Y register for later use by the XR routine.

As discussed hereinbefore, the block 234 provides the starting point for immediate addressing and the block 242 provides the starting point for immediate addressing when the operation requires a write into the memory. In the immediate addressing modes, the operand itself, as opposed to the address of the operand in the case of the global addressing mode is contained within the instruction. Thus, the block 234 is entered from the instruction fetch (XF) routine when immediate addressing is specified. The block 234 performs the same function as that discussed hereinbefore with respect to the blocks 220 and 224 with the exception that in the block 234 the word of procedure in addition to being placed into the D register (D0) is also placed into H register 41 via internal bus 28. In the case of immediate addressing, the word of procedure obtained from the procedure buffer (BP) is the operand itself. In the block 234 the program counter 20 and the counter 33 are incremented by 1 to step past the second word of procedure in the instruction. The sign flip-flop (FFSIGN) is also set to contain the sign of the operand. As indicated hereinbefore, the decision block following the firmware word block is a part of such firmware word block and in this case, a question of whether or not the immediate operand is a single word is questioned in block 234 as indicated by block 236. If the immediate operand is a single word, the block 234 exits to the execution (XE) routine 120 with the one word operand in the D register of register file 70 and the H register 41. The determination of whether the operand is a one word operand is made by examining the contents of F register 36. If the immediate operand is not a one word operand, the firmware operation of the block 238 is performed. The firmware operation of the block 238 places a 20-bit value onto internal bus 28 and into the D register of register file 70. The 20-bit value is composed of the four most significant bits being set to zero (bits 0C through 0F), the left byte (bits 10 through 17) containing the most significant bit of the H register, and the right byte (bits 18 through 1F) containing the left byte of the H register. This results in the D register containing the sign-extended value of the left byte contained in the second word of procedure of the instruction. The block 238 also sets the sign flip-flop (FFSIGN) to the sign of the H register which is also the sign of the left byte. The firmware operation of the block 238 also performs the test indicated by the block 240 to determine whether the immediate operand is a half-word immediate operand by examining the contents of F register 36. If the immediate operand is a half-word operand, the block 238 exits to the execution (XE) routine 120 to perform the operation. If the immediate operand is not a half-word operand, then the block 238 exits to the block 244 as will be the case for double-word or quad-word immediate operands. In summary, the blocks 234 and 238 provide the operation necessary for immediate one-word and half-word operands and exit to the XE routine with the operand in the D register. The block 242 is entered for the case of immediate operands involving a write operation. The block 242 stalls the processor until a word of procedure becomes available in the procedure buffer, i.e., the P1 or P2 registers 25 or 27. The block 242 then increments the P register 20 by 1 to step over the location into which the result of the operation is to be written and then increments counter 33 by 1 to indicate the two words of procedure have been used in processing the current instruction. The block 242 then exits to the block 244 which is also entered from the block 240 to continue the processing of double-word and quad-word immediate operands. The block 244 then uses the ALU (adder 96) to increment the contents of Q register 76 by 1 and via internal bus 28 places the result in Y register 22. Upon entry to the block 244, the Q register contained the value of the program counter placed there in the block 202 of the XF routine, i.e., the memory address of the first word of the instruction currently being executed. Incrementing the contents of the Q register by 1 in the block 244 results in the Y register containing the memory address of the second word of the instruction which is the memory address of the first word of the immediate operand contained in the instruction, and by way of the above example, the Y register will contain memory address 101 upon the completion of the firmware operation of block 244. The test indicated in block 246 is performed as part of the firmware operation of block 244 and tests whether the operand is a half-word of full-word immediate operand. If the operand is a half-word or one-word immediate operand, the block 244 exits to the XR routine 117. The test of block 246 is performed by examining the instruction contained in F register 36. If the instruction indicates that the operation involves a double-word or quad-word immediate operand, the block 248 is entered. The block 248 increments the program counter 20 by 1 to step past the second word of the operand and increments counter 33 by 1 to indicate that three words of procedure have been used in executing the current instruction. The test indicated by block 250 is also performed as part of the block 248 firmware operation. The block 248 tests to see whether the operation involves a double-word or quad-word immediate operand. If the immediate operand is a double-word operand, the block 248 exits to the XR routine. If the instruction involves a quad-word immediate operand, the block 248 exits to block 252 which in conjunction with block 254 increments the program counter past the third and fourth word of the operand and increments counter 33 by 2 to indicate that five words of procedure have been utilized in executing the current instruction. Upon completion of the block 254, the firmware exits to the XR routine. In summary, the firmware operations beginning with the block 234 and the block 242 provide for immediate operands. In the case of half-word or one-word immediate operands, the firmware places the operand in the D register and exits to the execution (XE) routine. Continuing by way of example, the cases of immediate operand addressing, upon exiting to the XR routine, the Y register will contain the memory address of the first word of the immediate operand, i.e., memory address 101; in the case of a half-word or one-word immediate operand, the P register 20 will contain memory address 102 and counter 33 will contain the value 2 to indicate that two words of procedure have been used; in the case of a double-word immediate operand, the P register will contain memory address 103 and the counter will contain the value 3; and in the case of a quad-word immediate operand, the P register 20 will contain memory address 105 and the counter 33 will contain the value 5 indicating that five words of procedure have been used in executing the immediate operand instruction.

As discussed hereinbefore, the block 256 provides the starting point for pop base addressing. Pop base addressing provides for the specified base register to be used as the operand address with the specified base register (BB) being incremented past the operand after the operand address is utilized in the instruction. Thus the block 256 provides for the specified base register (BB) to be loaded into Y register 22 via internal bus (BI) 28. The contents of the specified base register are also incremented by 1 and placed back into the specified base register. As part of the firmware operation of block 256, the test indicated in block 258 is performed to test whether the operand is a half-word or full-word operand. This test is performed by examining the instruction in F register 36. The block 256 exits to the XR routine if the operand is a half-word or one-word operand. In the case of a double-word or quad-word operand, the block 256 exits to the block 260 which again increments the specified base register by 1 and tests whether the operand is a double-word or quad-word operand. If the operand is not a quad-word operand, i.e., it is a double-word operand the block 260 exits to the XR routine. In the case of a quad-word operand, the block 260 exits to block 264 and in conjunction with the block 266 increments the specified base register by 2 before exiting to the XR routine. In summary, the result of pop base addressing provided by the starting point of block 256 is to exit to the XR routine with the Y register containing the memory address of the operands originally contained in the specified base register (BB) and with the specified base register incremented past the operand, i.e., incremented by 1 for half-word and one-word operands, incremented by 2 for double-word operands and incremented by 4 for quad-word operands. Continuing by way of example, if the base register 5 (B5) is the specified base register of the instruction contained in F register 36 and if B5 upon entry to the block 256 contains memory address 1000, upon exit of the pop base addressing firmware to the XR routine, the Y register will contain memory address 1000 and B5 will contain 1001, 1002, or 1004 depending upon whether the operand is a half- or one-word operand, double-word operand or a quad-word operand respectively.

The block 268 provides the starting point for push base addressing which is the inverse addressing mode of pop base addressing, i.e., the specified base register is predecremented before being used to point to the instruction operand. The block 268 provides for the specified base register (BB) to be decremented by 1 via the ALU (adder 96) and for the decremented value to be placed on internal bus 28 and into Y register 22. The test indicated by block 270 is performed as part of the firmware operation of the block 268. If the operand is a half-word or one-word operand, the block 268 exits to the XR routine with the Y register containing the operand address and the specified base register decremented by 1. If the operand is a double-word or quad-word operand, the block 268 exits to the block 272 which again decrements the specified base register and places the result in the specified base register and into the Y register 22. The quad-word operand test indicated by the block 274 is performed as part of the firmware operation of the block 272. The block 272 exits to the XR routine if the operand is a double-word operand. If the operand is a quad-word operand, the firmware operation of the blocks 276 and 278 are performed which further decrements the specified base register by 2 and places the result in the Y register 22. In summary, the firmware operations started in block 268 provide for the specified base register to be decremented by the number of words in the operand and the Y register to be set to the final decremented specified base register value. Continuing by way of example, if base register 5 (B5) is the specified base register and B5 contains memory address 1000, upon exit to the XR routine the B5 register in register file 70 and Y register 22 will contain the value 999, 998, or 996, depending upon whether the operand is a half- or one-word, double-word or quad-word operand respectively.

The XA routine also provides the capability of base register indexed push-pop addressing. For indexed base register relative push addressing, a decrement of the contents of the specified index register by 1 occurs and then a computation of the effective address of the data to be used. For indexed base relative pop addressing, there is provided a computation of the effective address of the location or data to be used in the operation. After computing such effective address, the contents of the address register are incremented by 1. The difference between push and pop addressing is determined by bit 1 of SEL register 37. If this is an indexed pop operation, block 280 is entered and the operation provided by the firmware represented thereby is executed. If this is a indexed push operation, block 290 is entered and the operation provided by firmware represented thereby is executed.

Thus for the base indexed pop operation, the contents of the selected index register (DX) will be transferred to the D register of register file 70 and onto internal bus (BI) 28. The sign flip-flop (FFSIGN) is also set to indicate the sign (most significant bit) of the specified index register. If on the other hand this is a base plus index push operation, block 290 will be entered and the contents of the selected index register (DX) will be decremented by 1 by the ALU (adder 96) and the result placed into the D register of register file 70 and onto internal bus 28. The test indicated by blocks 282 and 292 are performed as part of the firmware operation of blocks 280 and 290 respectively. A decision is made as indicated in blocks 282 and 292 as to whether or not the addressing is for a full word. If so, the block 284 is entered. If not, then block 294 is entered for addressing a byte or bit. If addressing a full word, then block 284 is entered and the contents of the specified base register is added to the contents of the specified index register (not contained in the D register) is added by the ALU and transferred to the Y register 22 via internal bus 28. Note that the 3-bit specified base register number is ANDed with a three with results in only base registers 1, 2 and 3 (B1, B2 and B3) being capable of being specified in base register indexed push-pop addressing. Also note that the 16-bit index register value is sign-extended before being added to the 20-bit base register value. As discussed hereinbefore, the FFWRAP flip-flop is set to the logical exclusive OR of FFSIGN and the carry out of the ALU for later use in the detection of an invalid address that exceeds 20 bits. If addressing is for a byte or bit, the block 294 is entered and the specified base register contents are transferred to the E register (B0). As in the block 284, in block 294 the specified base register number is ANDed with a three such that only base registers B1, B2 or B3 may be used in base register indexed push-pop addressing. As part of the firmware operation of blocks 284 and 294, the test indicated in blocks 286 and 296 respectively are made. The difference between direct and indirect addressing is specified by SEL register 37, bit 1. If indirect addressing is specified, block 288 is entered and if direct addressing is specified, block 298 is entered. If indirect addressing is specified, block 288 is entered and the contents of the specified index register are incremented by 1 and the hexadecimal constant 0xxx0 is put on internal bus 28 and the four least significant bits are transferred into SEL register 37. The transferring of the four least significant bits on internal bus 28, i.e., bits 1C through 1F, effectively clears the 4-bit SEL register. Bit 1 of the SEL register is the indirect addressing bit and bits 2 through 4 of the SEL register represent the base register number. If direct addressing is specified, the block 298 is entered and the contents of the specified index register are decremented by 1. As in block 288, block 298 clears the 4-bit SEL register by placing the hexadecimal constant 0xxx0 onto the bus and then into SEL register 37. Blocks 288 and 298 exit to the XR routine. In summary, for base register index push-pop addressing; the blocks 280 and 290 centralize the contents of the specified index register into the D register of register file 70; and if full word addressing, adds the index value to the base value in the block 284; or if byte or bit addressing, centralize the base register into the E register (B0). The block 288 then increments the index value in the case of indirect addressing and the block 298 decrements the index value in the case of direct addressing with both blocks then exiting to the XR routine.

As discussed hereinbefore, the block 300 provides the starting point for data register addressing, i.e., the operand is contained in the data register. The block 300 is entered and the specified data register (DB) is transferred via the ALU (adder 96) into the D register (D0) of register file 70. The contents of the specified data register are also transferred to H register 41 via internal bus 28. The FFSIGN flip-flop is also set to the most significant bit of the specified data register. The test indicated by block 302 is performed as part of the firmware operation of block 300. If the operation is a half-word operation as indicated by examining the instruction bits in F register 36, the block 304 is entered. If the instruction is a one-word operand instruction, the block 300 exits to the execution routine (XE) 120. For half-word operations, the block 304 is entered and the H register is used to sign-extend the half-word operand contained in the right byte of the H register by placing the right byte of the H register on internal bus 28 and into the D register. The FFSIGN flip-flop is also set to indicate the status of bit 10 of the internal bus which is the most significant bit of the right byte at this time. In summary, the function of the blocks 300 and 304 is to centralize the operand in the specified data register into the D register and to set the FFSIGN flip-flop to the sign of the one-word or half-word operand before exiting to the XE routine 120.

The block 306 provides the starting point for base register addressing, i.e., the operand is contained in a specified base register. The block 306 is entered and the contents of the specified base register (BB) is transferred to the D register and is placed on internal bus 28. The sign of the 20-bit base value is also transferred to the FFSIGN flip-flop. In summary, the block 306 centralizes the specified base register value into the D register and sets FFSIGN flip-flop before exiting to the XE routine 120.

As discussed hereinbefore, the block 308 provides the starting point for positive immediate operands. In block 308 the hexadecimal constant 000FF is placed on internal bus 28. The ALU performs the logical AND of the contents of the internal bus and the D register and places the result back into the D register. The FFSIGN flip-flop is also set to zero, i.e., indicating a positive value. Upon entry to the block 308 the D register contains the first word of the instruction as placed there by block 200 of the instruction fetch (XF) routine. Thus, in summary, the block 308 centralizes the right byte, i.e., positive immediate values of zero through 127 into the D register of register file 70 before exiting to the execution routine. The block 310 provides the starting point for negative immediate operands. The block 310 is entered and the hexadecimal constant 0FF00 is placed on internal bus 28. The arithmetic logic unit then performs the logical OR of the contents of the D register and the internal bus 28 placing the result in the D register. The FFSIGN flip-flop is then set to 1, indicating a negative value. In summary, the block 310 provides for the sign extension of the negative immediate value contained in the right byte of the instruction into the left byte (bits position 10 through 1F) of the D register and for the setting of the FFSIGN flip-flop to a negative one before entering the executive (XE) routine 120. Other types of address subroutines are also provided in the system which subroutines are not pertinent to the system of the present invention.

Now with reference to FIG. 6 (FIGS. 6A through 6D), pertinent portions of the indirect index and operand fetch (XR) routines 117 and 118 will be discussed in further detail. Upon entering the XR routine, various subroutines thereof may be performed depending upon the opcode of for example the SEL register 37 contents. For example, if bit 1 of the SEL register, i.e., the indirect addressing bit, is set to a binary ONE, then block 400 will be entered and the firmware operation represented thereby will be executed. The data memory read cycle initiate (DMRCI) will be performed and in so doing, the Y register 22 which includes the unindexed address of the operand will be transferred to the address lines of the external bus (BA). It being noted that the Y register 22 was set to contain the indirect address of the operand by a firmware operation of the XA routine. The block 400 then places the hexadecimal constant 0xx0 into the H register via internal bus 28. The SEL register 37 is also cleared by transferring the four least significant bits of the above hexadecimal constant into the 4-bit SEL register. The first flip-flop (FFIRST) is also set to a binary ONE. It is noted that the entry into any XR subroutine clears the FFIRST flip-flop to a binary ZERO. Therefore, the block 400 again sets the FFIRST flip-flop to a binary ONE so that one of the XR index subroutines starting at block 414, 422 or 424 may be entered later. As discussed hereinbefore in the XF routine, the FFIRST flip-flop is set to a binary ONE by the firmware operation of the block 400. The test indicated by the block 402 is performed as part of the firmware operation of block 400. If the processor is operating in the LAF (long addressing format) addressing mode, the block 404 is entered. Upon entry to the block 404, the processor clock is stalled until the data word requested by the preceding DMRCI becomes available in the data buffer (BD), i.e., the DT register 23. When the DSTALL of the block 404 is complete, the first word of the LAF address (BD) is transferred to the H register 41 via internal bus 28. The first word of the indirect LAF address is also transferred to the E register (B0) of register file 70 via the ALU. The Y register, which contains a pointer to the first word of the indirect LAF address, is incremented by one to point to the second word of the indirect LAF address. The block 404 exits to the block 406 which performs a data memory read cycle initiate to initiate the reading of the second word of the indirect LAF address. The hexadecimal constant 0FFF0 is placed on the internal bus 28 and added to the first word of the indirect LAF address currently in the E register (B0). The test indicated by the block 408 is performed as part of the block 406 firmware operation. If a carry occurs out of bit position 10 as a result of adding the constant to the first word of the LAF address, an invalid address has been specified and the firmware exits to the routine which handles bad addresses. If there is no carry, the block 406 exits to the block 410 which does a data stall (DSTALL) until the second word of the indirect LAF address becomes available. When the second word becomes available in the data buffer (DB), it is placed on the internal bus 28 along with the four least significant bits of the first word of the indirect LAF address and thereby concatenated to form a 20-bit LAF address which is transferred to Y register 22. The block 410 then exits to another XR routine. Typically, upon re-entering the XR routine, either an index operation or a normal read operation will take place. Returning to the block 400, if the processor is operating in SAF (short addressing format) addressing mode, the block 400 will exit to the block 412. Upon entry to the block 412, the processor stalls the clock (DSTALL) until the one word SAF indirect address becomes available in the data buffer (BD). When the SAF indirect address becomes available, the block 412 places it into the Y register 22 via internal bus 28 (BI) setting the most significant four bits of the 20-bit Y register to ZERO. The block 412 then exits and re-enters the XR routine. In summary, the indirect XR routine starting at the block 400 reads the indirect address from memory and places it into the Y register 22. In the case of a LAF address, two words of data are read from memory and a 20-bit address is formed by concatenating the four least significant bits of the first word and the 16 bits of the second word. The four least significant bits of the first word are the four most significant bits of the 20-bit LAF address. If in SAF mode, a single word is read from memory and placed in the Y register with the four most significant bits of the 20-bit Y register being set equal to ZERO. It being noted that the test indicated by block 402 tests the status of the FFLAF flip-flop, one of the flip-flops of the hardware control flip-flop 54. Upon re-entry of the XR routine from the block 410 or 412, the indirect address bit, i.e., SEL register 37 bit 1 has been reset so that the indirect routines starting at the block 400 will not be re-entered. If quad or double word indexing is specified and if the FFIRST flip-flop is a binary ONE, the block 414 is entered. The block 414 doubles the index value by shifting the sign extended index value in the D register (D0) one bit position to the left and places the result back into the D register of register file 70. The test indicated by block 416 is performed as part of the firmware operation of block 414. If a quad word operand is being addressed, the block 418 is entered and the index value is again doubled by adding the index value to itself and placing the result back into the D register. If a double word operand is being addressed, the block 414 exits to block 420. The block 420 then adds the quadrupled or doubled specified index value to the contents of the specified base register (BB) by using adder 96 and places the result into Y register 22 via internal bus 28. The FFWRAP flip-flop is also set to indicate if an invalid address, exceeding 20 bits, has been formed. The block 420 then re-enters the XR routine. In summary, the firmware operation starting in block 414 either doubles or quadruples the index value centralized to the D register by an earlier XA routine and then adds the index value to the contents of the specified base register and leaves the final effective address in Y register 22. If indexing to a word operand is specified and if the FFIRST flip-flop is a binary ONE, the block 422 is entered. The block 422 adds the sign extended value of the specified index register found in the D register to the contents of the specified base register via adder 96 and places the 20-bit result in the Y register 22 via internal bus 28 and also sets the FFWRAP flip-flop to indicate a possible invalid address before exiting and re-entering the XR routine. In summary, the block 422 computes the final effective address by adding the index value to the base value and places the result in the Y register 22. If indexing to a byte or bit operand is specified and if the FFIRST flip-flop is a binary ONE, the block 424 is entered. The block 424 places the index value in the D register onto the internal bus 28 and using the shift logic 80 of RALU 12 shifts the index value one bit position to the right and places the bit shifted out of bit position 1F into the XB register 32 and the shifted index value back into the D register. The test indicated by block 426 is also performed as part of the firmware operation of the block 424. If the addressing is to a half word operand, i.e., byte, the block 424 exits to the block 434. If the addressing is to a bit, the block 424 exits to the block 428 which performs the same operation as discussed hereinabove with respect to block 424, i.e., shifts the index value one bit position to the right. The blocks 430 and 432 similarly shift the index value two more positions to the right before exiting to the block 434. In the block 434, the shifted index value contained in the D register is sign extended and added to the specified base register contents via adder 96 and placed into Y register 22 via internal bus 28. The FFWRAP flip-flop is also set to indicate a possible invalid address. In summary, if indexing is to the byte or bit level, the firmware operation starting in block 424 shifts the index value either one place or four places to the right so that the shifted index value is aligned to the word level and the shifted value is then added to the contents of the specified base register to form the final effective address and the result is stored in the Y register. The XB register is also set to contain the one or four bits shifted out of the index value for later use in addressing the byte or bit. The block 434 then exits to the XR routine.

With reference to the normal read subroutine of the operand read routine 118, the data memory read cycle (DMRCI) is initiated as indicated by the firmware word represented by block 436. The E register (B0) is also cleared to ZERO. The test indicated by the block 438 is also performed as part of the firmware operation of the block 436. If a half word operand is being read, the block 440 is entered and the D register (D0) of the register file 70 is cleared to ZERO and the final effective address is placed on the external bus (BA). The block 440 then exits to block 442 which stalls the processor clock until the word of data containing the instruction operand becomes available. When the data word becomes available, the data buffer (BD) is transferred to H register 41 via internal bus 28 and to the D register via the ALU. The test indicated by the block 444 is performed as part of the firmware operation of the block 442. If bit position 0 of the XB register 32 contains a ZERO, the operand is in the left byte of the word and the block 446 is entered. The block 446 places the left byte of the H register (bits 10 through 17) onto the right byte lines of internal bus 28 and places the most significant bit of the left byte on the left byte lines of internal bus 28 and via ALU (adder 96) into the D register. The FFSIGN flip-flop is also set to contain the most significant bit of the left byte of the operand. If the operand is in the right byte, the block 448 is entered from the block 442 and the right byte of the D register is placed on the right byte lines of internal bus 28 and the most significant bit of the right byte of the H register is placed on the left byte lines of internal bus 28 and via the ALU is transferred to the D register. The FFSIGN flip-flop is also set to the bit 10 of internal bus 28 which contains the most significant bit of the right byte at this point. In summary, if a byte operand is being read, the blocks starting at block 436 read the word containing the operand from memory and place it into the H register. The H register is then used to place either the left or right byte into the right byte position of the D register (D0). The block 450 is entered from the block 436 if the operand is not a half word operand. The block 450 performs the same firmware operation as that specified by the block 442, i.e., the processor clock is stalled until the operand becomes available from memory whereupon it is placed into the H register via internal bus 28 and into the D register via the ALU. In addition, the block 450 sets the FFSIGN flip-flop to the most significant bit of the operand. The test indicated by the block 452 is performed as part of the firmware operation of the block 450. If the operand is less than or equal to a word, i.e., a bit or a word operand, the block 450 exits to the execution (XE) routine. If the operand is a double word operand, the block 450 exits to the block 454. The block 454 places the memory address of the first word of the operand contained in Y register 22 onto the external bus (BA) and via internal bus 28 into RAM 13 location 8 (RAM8). The contents of the Y register are then incremented by one so that the Y register points to the second word of the double word operand. The block 454 also places the first word of the operand, in the D register, into the Q register 76 and then exits to the block 456. The block 456 does a data memory read cycle (DMRCI) to initiate the reading of the second word of the double word operand. The validity of the double word operand is then tested by placing the hexadecimal constant 0FFF0 on the internal bus and adding it to the first word of the operand contained in the D register (D0) by using adder 96. The carry from bit position 10 resulting from the addition is then placed into the FFMISC flip-flop for later testing the validity of the double word operand. A carry will indicate that the 12 most significant bits of the first word of the operand are not all ZEROS and therefore the operand is an invalid double word operand. The block 458 then stalls the processor clock until the second word of the double word operand becomes available in the data buffer (BD). When the second word of the operand becomes available it is placed on internal bus 28 along with the four least significant bits of the first word of the operand contained in the H register. The 20-bits contents of the internal bus 28 are then transferred to the D register. The FFSIGN flip-flop is then set to contain the most significant bit of the 20-bit operand. The test indicated by the block 460 is performed by the firmware operation of the block 458. If bit position 6 of F register 36 is not equal to a binary ONE, the block 458 exits to the execution (XE) routine. If bit position 6 of the F register is a binary ONE, the instruction being executed is a swap base instruction and the block 462 is entered. The block 462 restores the Y register to point to the first word of the double word operand by transferring the contents of RAM 13 location 8 via internal bus 28 into Y register 22 before exiting to the execution routine. In summary, the firmware operation provided by the blocks starting with the block 450 retrieve the operand from memory and place it in the D register of register file 70 before exiting to the execution routine.

The no read subroutine is entered dependent upon the opcode in the F register 36; for example, if the operation code specifies a store base instruction. The test indicated by block 466 is performed as part of the firmware operation of the block 464. The block 464 tests the status of the FFWRAP flip-flop which as discussed hereinbefore will be set equal to a binary ONE if an invalid address was computed earlier. If the FFWRAP flip-flop is set to a binary ONE, the block 464 exits to the bad address trap routine. If the flip-flop is not set, the block 464 exits to the execution (XE) routine.

The read-modify-write routine is entered dependent upon the opcode in the F register 36, for example, if the opcode specifies an increment instruction, the contents of the specified memory location are to be read from memory incremented and replaced in memory without allowing any intervening access to the location being incremented. Thus, upon entry to block 468, a data memory read cycle initiate with lock is performed to read the location specified in the Y register from memory and the E register (B0) is cleared to ZERO. The block 468 then exits to the block 470 which performs the test indicated by block 472. If an acknowledge (ACK) is not received from the DMRCI with lock, the block 470 exits to block 468 which will continue to do the DMRCI until an acknowledge is received. When the acknowledge is received, indicating that the memory containing the location specified in the Y register is not currently being used by another processor performing a locked operation, the block 470 exits to block 474. The block 474 stalls the processor clock until the memory location becomes available in the data buffer (BD). The data buffer is then transferred to the D register and H register 41 via internal bus 28 and the FFSIGN flip-flop is set to the most significant bit of the operand read from memory. The block 474 then exits to the exeuction (XE) routine. In summary, the firmware operation starting at the block 468 reads the operand from memory, if the memory is not currently being used by another processor performing a locked operation and when the operand becomes available places the operand in the D register and the H register before exiting to the execution routine 120. Other types of indirect index and operand fetch (XR) subroutines are also provided in the system, which subroutines are not pertinent to the system of the present invention. In summary, referring to FIG. 3, the instruction fetch routine (XF) 112 places the first word of the instruction in the F register and in the D register and increments the P register. The address formation routines (XA) 113, 115 and 116 centralize the unindexed operand address into the Y register and the index value into the D register before exiting to the XR routine. In the case of an immediate operand, the XA routines centralize the operand into the D register before exiting to the XE routine. The indirect index and operand fetch routines (XR) 117 and 118 combine the unindexed operand address in the Y register with the index value in the D register and read the operand specified by the final effective address from the memory and centralize the operand into the D register before exiting to the execution (XE) routine 120.

Figure 7:
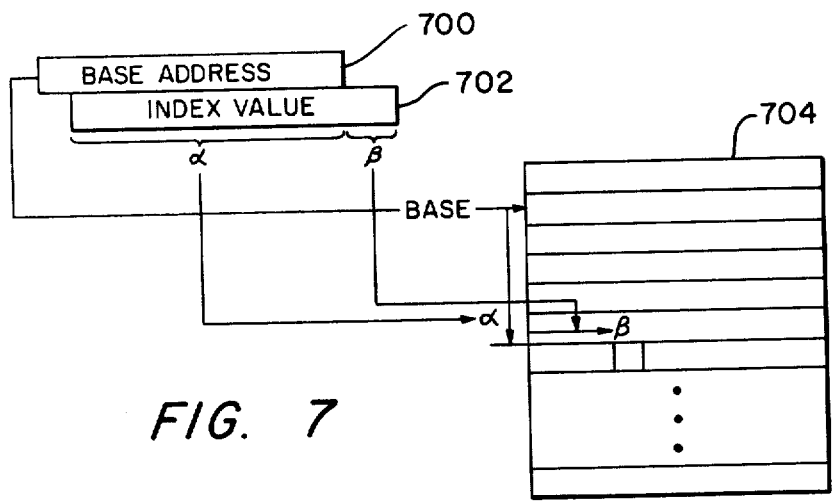
FIG. 7 illustrates by general block diagram the manner in which words, bytes or bits may be effectively addressed in a memory associated with the data processor of FIG. 1.

Now referring to FIG. 7, the manner in which a byte or a bit is addressed is further illustrated. The base address 700 is unindexed and is included in the specified base register (BB). The index value 702 is normally provided in the D register (D0) included in register file 70. Depending upon whether there is a byte or bit operation, the contents of the D register are shifted into the XB register once if it is a byte operation or four times if it is a bit operation that is involved. If it is simply a word to be addressed, there is no shift. The value which is shifted into the XB register 32 is that designated beta, and the "word" portion of any indexing from the base address is that indicated by alpha in the index value 702, which alpha value is in the D register. Accordingly, the base address 700 addresses the storage device 704 at the location indicated by such base address, the alpha index value provides the word indexing to a word location and the beta indexing value provides indexing either to the left byte or the right byte of the addressed word depending upon the single shifted bit in the XB register 32 or the beta index value provides indexing to one of for example 16 bits of the addressed word if the beta value shifted into XB register is four bits in length. It should be understood that the above described indexing operation may be utilized for operations involving double, quad or more words by using such indexing technique to provide left shift(s) of the index value rather than right shift(s) as shown.

Figure 8:
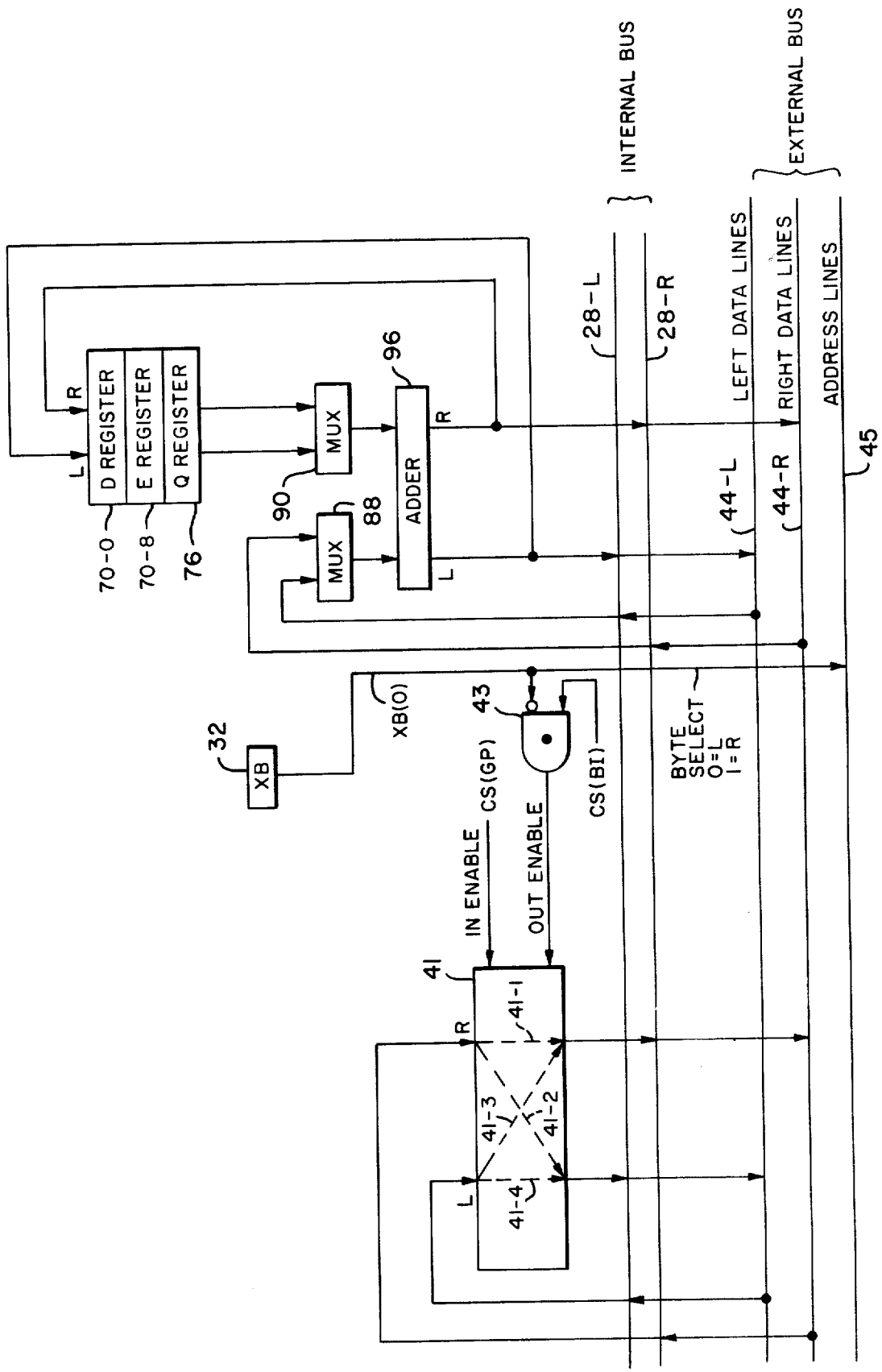
FIG. 8 illustrates the manner in which a single byte of a multi-byte word may be either read or written with memory associated with the data processor of FIG. 1.

With reference to FIG. 8, the manner in which a byte contained in a word is written into or read from memory shall be explained. The interface to memory from the processor is via the internal bus left lines 28-L and right lines 28-R which couples to the external bus which is comprised of left data lines 44-L and right data lines 44-R and address lines 45. The external bus also includes control lines as shown in FIG. 1. The H register is shown as element 41. The D register in register file 70 is shown as element 70-0 and the E register in register file 70 is shown as element 70-8. The D and E registers are shown coupled with adder 96 of RALU 12 via multiplexer 90, although it could have been coupled via multiplexer 88. The XB register 32 is also shown coupled with H register 41 via AND gate 43 as well as the address lines 45 of the external bus. For full word read or write operations, the data passes directly to RALU 12 without first being manipulated by H register 41 as the data is read from memory or by being manipulated by H register 41 as the data is written into memory. To simplify the following discussion of FIG. 8 it will be assumed that registers D, E and H are each 16-bits wide providing for two 8-bit bytes of data. This simplifying assumption can be made because in the instant implementation, the memory contains words of 16-bits each and therefore the most significant 4 bits of 20-bit registers are not of importance when reading from or writing to memory.

The half-word write operations are performed in two steps. During the first step, the byte to be written is contained in the right byte of E register 70-8 which is gated onto internal bus 28 and into the right byte of H register 41. During the second step, if the right byte is to be written depending upon whether the XB register 32 contains binary ZERO or ONE, the E register 70-8 is again gated onto internal bus 28 and onto external bus data lines 44-L and 44-R. This results in the memory receiving the right byte on the right data lines 44-R with one of the address lines 45 containing the value (a binary ONE) of the XB register 32 indicating to the memory that the right byte is to be written. If the left byte is to be written into memory, during the second step the H register 41 is enabled in response to the BI field of the firmware word and the right byte is transferred to the left byte position via path 41-2 and is placed on internal bus 28 and onto external bus left data lines 44-L. During this same second step, the left byte is gated to the right internal bus lines 28-R and subsequently onto the right data lines 44-R of the external bus. In the case of writing the left byte the value in XB register 32 (a binary ZERO) is also placed on external bus address line 45 indicating that the left byte is to be written into memory. Note that in writing either a left or right byte of data into memory the memory receives two bytes of information on external bus data lines 44. The byte to be written into memory is prepositioned by the logic of FIG. 8 into the correct byte position so that the memory need only look at the address lines 45 which contain the left/right indicator received from the XB register 32 to decide which byte shall be written into the memory and need not shift the information within the memory controller prior to writing it into memory.

The half-word read operations are also performed in two steps. During the first step the data on the external bus data lines 44 is gated onto internal bus 28 and into H register 41 and D register 70-0. If the left byte is to be read from memory, during the second step the left byte in the H register 41 is transferred to the right internal bus lines 28-R via path 41-3 and the most significant bit of the left byte is sign-extended via path 41-4 and appears on the left internal bus lines 28-L. The internal bus 28 data is then gated into D register 70-0 resulting in the left byte being in the right byte position with the left byte position containing the sign-extension of the most significant bit of the left byte. If the right byte is to be read from memory the right byte of D register 70-0 is gated onto the internal bus 28 along with the high order bit of the right byte from H register on path 41-2 resulting in the sign-extension of the right byte. The internal bus 28 is then gated into D register 70-0 resulting in the right byte being in the right byte position with the left byte position containing the sign-extension of the most significant bit of the right byte.

Figure 9:
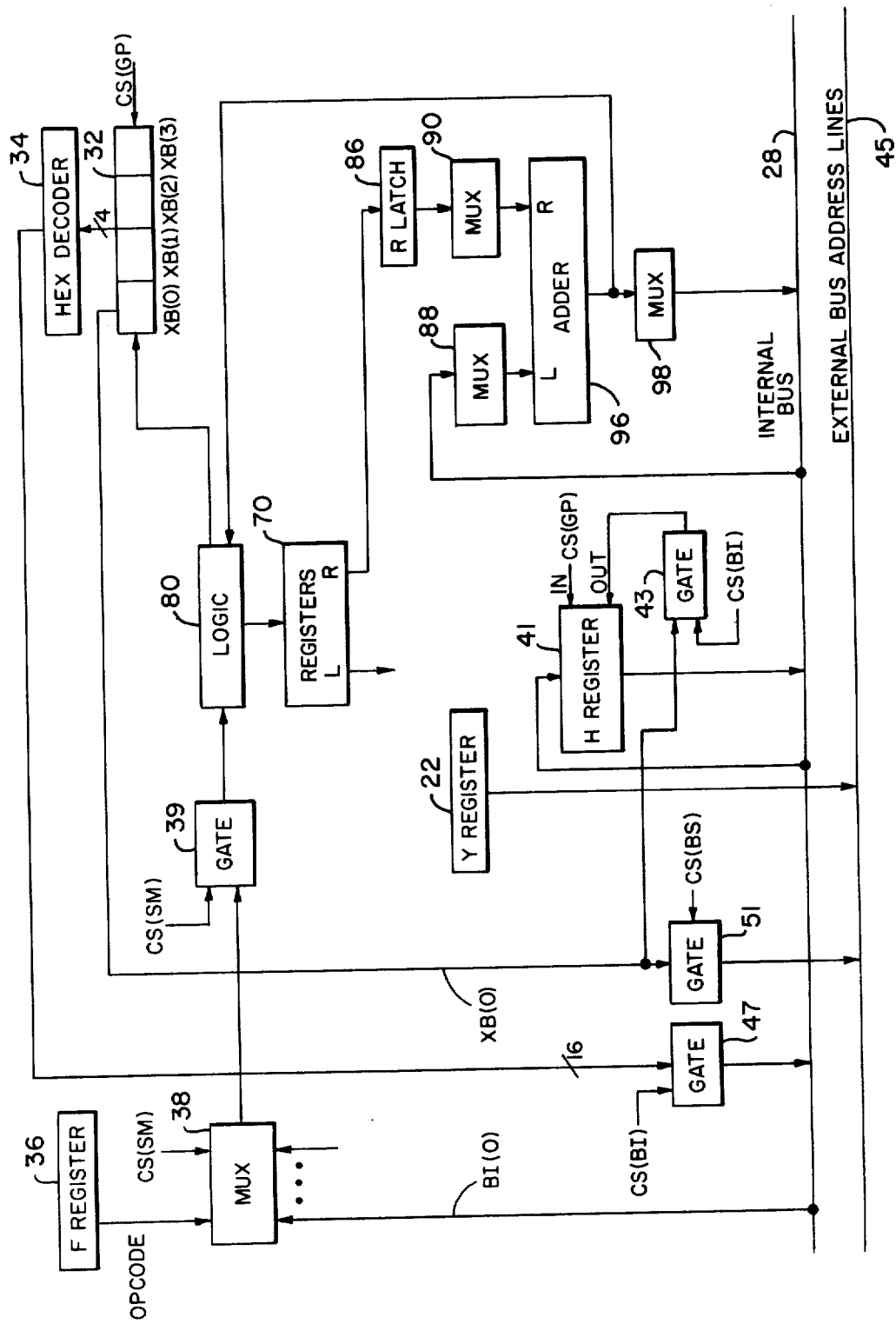
FIG. 9 provides a more detailed block diagram of the manner in which a byte or bit may be effectively addressed by the data processor shown in FIG. 1.

Now referring to FIG. 9, the logic of FIGS. 1 and 2 are shown in more detail with respect to illustrating the manner in which shift or indexing operations are performed. During indexing operations, the index value is placed in the D register which is included in the register file 70. The opcode in the F register 36 is then tested to see whether or not this is a full word or a non-full word operation. A non-full word operation would imply either a byte or bit operation. If it is a full word instruction, then the indexing is already correctly aligned, and after sign-extending the 16-bit index value to 20 bits no further operation is required with respect to indexing. If it is a half-word or bit instruction, it is necessary to shift the index value one or more times. The shifting is provided by means of the RALU 12 and the contents of the D register are extracted via the right latch 86. The output from the D register is then passed through the multiplexer 90 and via the adder 96 back into shift logic 80 where it is shifted right and then back into the D register again. One bit position is shifted for each processor clock cycle. No further shifts are required if this is a byte operation. At the same time that the shifting operation takes place, the most significant bit of the D register, i.e., the bit which indicates the sign of the contents of the index value, is provided via multiplexer 98 and logic 61 to the internal bus 28. By doing this, this bit zero of the D register will be available as a shift input to selector 38 which includes other inputs which are not relevant to the present invention. The input selected depends on the opcode of F register 36 as well as the SM field of the control store word or firmware word. Bit zero of the D register is then enabled via gate 39 in response also to the SM field of the control store word as an input to the shift logic so as to provide the shift input thereof a sign extension, i.e., the same bit which was previously in bit zero which indicates that the sign remains the same even after the shift in the D register. Thus, the sign extension is provided in the left-hand bits which are vacated during the shift operations thereby maintaining the proper sign for the index value. Thus, the direction of displacement indicated by the index value in the D register will remain consistent.

The bit which is shifted to the right during the shift of the D register is provided as an input to the XB register 32 into bit position XB (O). The control store field (GP) enables the XB register to shift to the right during the shift of the D register so that the shifted bit is captured in bit position XB (O) for subsequent use in selecting right byte versus left byte when a word has been fetched from memory. As indicated previously, after this one bit shift, the opcode in the F register 36 is tested by means of the test logic 50 to determine whether it is a byte or a bit operation. If it is a bit opcode, then the shift operation is performed three more times. Each time this is done, the D register sign is shifted or extended one bit further and the shifting of the successive bits in the D register occurs as indicated hereinbefore and is provided successively via position XB (O) into the remaining three positions of the XB register 32 so that what was previously in bit position XB (O) is now in bit position XB (3), etc. Thus, the rightmost bit, or most significant bit 1F, in the D register for bit operations is finally transferred and placed in position XB (3), bit 1E is placed in position XB (2), etc.

The use of the information which has been placed in the XB register 32 is as follows. For half-word read operations, the XB register 32 includes one bit in the XB (O) position. This indicates whether the byte selector has selected the left byte or the right byte in the word that is to be address in memory, a binary ZERO indicating left and a binary ONE indicating right. During half-word read operations, this bit is used to control H register 41 by means of gate 43 which includes an enabling input from the BI field of the control store word. A word is read from memory using the sum of the contents of the specified base register plus the index value in the D register. As previously indicated, if XB (O) is a binary zero, then the left-half of the data at the input of H register 41 is copied into the right byte of the H register 41 and the most significant bit of the left byte is sign-extended into the left byte of the H register 41 and thus into the input of the adder 96. If XB (O) is a binary ONE, then the data passes right to right. The data is then placed in the D register in register file 70, such D register being the operand register for all memory reference instructions.

During half-word write operations, the D register in register file 70 which contains the data to be written, is enabled under the control of the control store via the adder 96 with multiplexer 98 into H register 41. The output enable of the H register 41 is controlled by the BI field of the firmware word and will cause in this particular type of operation the both halves of the word to be copied in H register 41 unchanged in preparation for writing into memory. At the same time, the control store 10 via the gate 51 allows the bit in bit position XB (O) of the XB register 32 to be emitted to the memory on one of the address lines of the external bus as the least significant bit to signify the half-word select bit of the address bus. When XB (O) is a binary ZERO, this indicates that the left-half of the data bus is to be copied onto the left-half of the memory word and enables gate 43 to put the output of H register 41 onto the bus data lines 44 with the bytes interchanged by the H register. When a binary ONE, this indicates that the right-half of the data bus is to be copied to the right-half of the memory word and the data goes directly from register file 70 to bus data lines 44 without any interchange of bytes being done by H register 41. Thus, XB (O) on write operation controls which half of the data word the correct byte is written into.

During bit operations, the contents of the XB register are used in a different manner. During indexed bit operations (i.e., the opcode in the F register 36 indicates a bit operation), then the XB register would have been shifted four times thereby providing four bits to indicate which of 16 bits is to be operated upon. These four bits in the XB register 32 are provided to decoder 34 which generates a mask of 16 bits, such mask including 15 binary ZEROS and one binary ONE or vice-versa depending upon the logic polarity in the system, thereby enabling operation only on the bit location which is differently masked from the other locations. The output of hexidecimal decoder 34 is enabled onto the internal bus 28 in response to the BI field of the control store firmware word via gates 47. This mask is then provided into the adder 96 via multiplexer 88. The mask is then placed in the Q register 76 in RALU 12 for purposes of this indexed operation. The contents of the Q register are then used to operate on the appropriate bit of the operand word. This is accomplished during the XE cycle by masking the contents or mask row in the Q register with the operand word received from memory.

It should be noted that in addition to providing XB(O) onto the address lines of the external bus via gate 51, that the contents of Y register 22 are also placed thereon for addressing the memory. By way of further note, the Y register 22 also includes the last address which was sent to the address lines and accordingly any time an address is provided onto the address lines, such address is also provided to the Y register 22.

Test logic 50 is responsive to the TC field in the firmware word. As indicated in FIG. 4, the TC field may include by way of example six bits 42 through 47. Accordingly, 64 test conditions may be selected. A discussion of the interaction of test logic 50 and the TC field can be found in U.S. Pat. No. 4,047,247 issued Sept. 6, 1977 and incorporated herein by reference. The function of the next address generation logic 52 is also discussed in detail in U.S. Pat. No. 4,047,247.

Having described the invention, what is claimed as new and novel and for which it is desired to secure Letters Patent is:

1. A data processing system comprising:
   data storage means having a plurality of addressable word storage locations, each of said locations storing a group of binary data bits representing a data word, said words including instruction words and operand address words stored at addresses proximate to said instruction words, said instruction words containing a code representing an operation to be performed by said system and said operand address words representing either short form addresses including S address bits or long form addresses including L address bits, L being a number which is greater than S and exceeding the number of bits in a word;
   an address mode indicator, responsive to an address mode signal, for indicating whether said system is operating in a first mode in which short form addresses are used or in a second mode in which long form addresses are used;

register means for storing data used by said system in effecting operations called for by the operation codes contained in said instruction words;

fetch means for addressing said data storage means to read instruction word and operand address word data therefrom at the beginning of each instruction execution cycle of said system and to load said data into said register means, said fetch means further operating in response to said address mode indicator when said system is operating in said second mode to execute a plurality of word read cycles to read a plurality of operand address words into said register means; and said fetch means further including means responsive to said address mode indicator when said system is operating in said second mode to combine the address bits of said plural operand address words read during said plurality of word read cycles to provide in said register means a long form address of L bits.

2. The data processing system of claim 1 wherein said instruction word points to a control word, said system further comprising a control store device having a plurality of said control words stored therein, each said control word containing a plurality of fields, said fields providing control signals for controlling the operation of said system, one of said fields for indicating an address of the next location in said control store to be addressed dependent upon a specified test result.

3. The data processing system of claim 2 further comprising an address mode switch for generating said address mode signal, wherein said address mode switch is set by an operator of said system.

4. The data processing system of claim 2 further comprising a means, responsive to an instruction executed by said system, for generating said address mode signal dynamically under program control.

* * * * *